(12) United States Patent
Yun et al.

(10) Patent No.: US 9,046,692 B2
(45) Date of Patent: Jun. 2, 2015

(54) DISPLAY DEVICE

(75) Inventors: Hae Young Yun, Suwon-si (KR); Il-Joo Kim, Hwaseong-si (KR); Jin Oh Song, Seoul (KR); Seung Jun Jeong, Hwaseong-si (KR); Jin Hwan Kim, Suwon-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 288 days.

(21) Appl. No.: 13/601,866

(22) Filed: Aug. 31, 2012

(65) Prior Publication Data

US 2013/0250193 A1 Sep. 26, 2013

(30) Foreign Application Priority Data

Mar. 23, 2012 (KR) ........................ 10-2012-0030161

(51) Int. Cl.
*G02F 1/133* (2006.01)
*G02F 1/13* (2006.01)
*G02B 27/22* (2006.01)

(52) U.S. Cl.
CPC ....................................... *G02B 27/22* (2013.01)

(58) Field of Classification Search
USPC ..................................................... 349/33, 201
See application file for complete search history.

(56) References Cited

U.S. PATENT DOCUMENTS

| | | | |
|---|---|---|---|
| 7,683,989 B2 * | 3/2010 | Woodgate et al. ............ | 349/123 |
| 7,710,535 B2 * | 5/2010 | Nomura et al. ............... | 349/200 |
| 7,710,536 B2 * | 5/2010 | Osawa et al. ................. | 349/202 |
| 2006/0280100 A1 | 12/2006 | Ooi et al. | |
| 2007/0127348 A1 | 6/2007 | Ooi et al. | |
| 2010/0026920 A1 | 2/2010 | Kim et al. | |
| 2010/0245743 A1 | 9/2010 | Yokoyama | |

FOREIGN PATENT DOCUMENTS

| | | |
|---|---|---|
| JP | 06-222358 A | 8/1994 |
| JP | 2010-134981 A | 6/2010 |
| JP | 2010-266551 A | 11/2010 |
| KR | 1020060039133 A | 5/2006 |
| KR | 1020070082646 A | 8/2007 |
| KR | 10-0784080 | 12/2007 |
| KR | 1020080048331 A | 6/2008 |
| KR | 1020090058772 A | 6/2009 |
| KR | 10-2011-0107405 A | 9/2011 |
| KR | 1020110104701 A | 9/2011 |
| WO | 2011-036736 A1 | 3/2011 |

* cited by examiner

*Primary Examiner* — Huyen Ngo
(74) *Attorney, Agent, or Firm* — Innovation Counsel LLP

(57) ABSTRACT

A display device includes a display panel for displaying an image. The display device further includes a lens configured to refract at least a portion of a collimated light having a center ray, a first outermost ray, a second outermost ray, a first plurality of rays between the first outermost ray and the center ray, and a second plurality of rays between the second outermost ray and the center ray. The lens may concentrate the first plurality of rays such that a first position on the display panel has a first light intensity. The lens may concentrate the second plurality of rays such that a second position on the display panel has a second light intensity. Each of the first light intensity and the second light intensity is substantially greater than a center light intensity on the display panel corresponding to at least the center ray.

18 Claims, 27 Drawing Sheets

DISPLAY DEVICE

CROSS-REFERENCE TO RELATED APPLICATION

This application claims priority to and the benefit of Korean Patent Application No. 10-2012-0030161 filed in the Korean Intellectual Property Office on Mar. 23, 2012, the entire contents of which are incorporated herein by reference.

BACKGROUND OF THE INVENTION (a) Field of the Invention

The present invention relates to a display device. In particular, the present invention relates to a display device including a lens for displaying three-dimensional stereoscopic images.

(b) Description of the Related Art

Three-dimensional stereoscopic display devices are have been commercialized as display technologies advance.

In general, stereoscopic images are displayed based on binocular disparity. In consideration that the left eye and the right eye of an observer receive different images, respectively, when the observer sees a three-dimensional structure, in order to present stereoscopic images, left images to be seen by the left eye and right images to be seen by the right eye are separately prepared and provided for the respective eyes of the observer.

In order for the observer to recognize stereoscopic images without wearing extra glasses, a barrier or a lenticular lens (which may include cylindrical lenses) may be used in a stereoscopic display device. A barrier used in a stereoscopic display may include slits for separating images into left images and right images to be seen by the respective eyes of the observer. A lenticular lens used in a stereoscopic display device may change light paths of images, thereby dividing the images into left images and right images to be seen by the respective eyes of the observer.

A stereoscopic display device that includes a lenticular lens may impose restrictive conditions, such as one or more optimum viewing distances and one or more optimum interpupillary distances, on the observer. If the conditions are not substantially satisfied, the stereoscopic images seen by the observer may be out of focus and may be blurry.

SUMMARY OF THE INVENTION

An embodiment of the invention is related to a display device that may provide stereoscopic images with satisfactory clarity as perceived by a user of the display device. The display device may include a display panel configured to display an image. The display device may further include a lens overlapping the display panel and configured to refract at least a portion of a collimated light that includes a center ray, a first outermost ray positioned at a first boundary of the collimated light, a second outermost ray positioned at a second boundary of the collimated light, a first plurality of rays positioned between the first outermost ray and the center ray, and a second plurality of rays positioned between the second outermost ray and the center ray. The lens may be configured to concentrate the first plurality of rays to a first position on a surface of the display panel such that the first position has a first light intensity The lens may be configured to concentrate the second plurality of rays to a second position on the surface of the display panel such that the second position has a second light intensity. The lens may be configured to transmit at least the center ray to a third position on the surface of the display panel such that the third position has a center light intensity. Each of the first light intensity and the second light intensity may be substantially greater than the center light intensity.

In one or more embodiments, the first position and the second position may be substantially symmetrical with respect to the third position.

In one or more embodiments, each of the first light intensity and the second light intensity may be greater than or equal to twice the center intensity.

In one or more embodiments, each of the first light intensity and the second light intensity may be greater than or equal to three times the center intensity.

In one or more embodiments, the lens may have a phase distribution having a shape that does not conform to any arc of any circle.

In one or more embodiments, the lens may have a phase distribution that is associated with a phase distribution function. The phase distribution function may include a sum of a first term and a plurality of additional terms. The first term may be a quadratic function of a position with respect to a center of the lens. Each of the plurality of additional terms may have a non-zero coefficient.

In one or more embodiments, each of the plurality of additional terms may be a cosine function.

In one or more embodiments, each of the plurality of additional terms may be a cosine function of the position with respect to a center of the lens multiplied by a parameter.

In one or more embodiments, the parameter may be an integer multiplied by $\pi$ and divided by a width of the lens.

In one or more embodiments, the lens may have a phase distribution that is associated with a phase distribution function. A slope of the phase distribution function that corresponds to a boundary of the lens may be determined by a minimum Fresnel zone width that is limited by one or more manufacturing conditions of the lens.

In one or more embodiments, the lens may include a plurality of electrodes for determining a phase distribution associated with the lens. The lens may include (or may be divided into) a plurality of Fresnel zones. None of the boundaries of the Fresnel zones is aligned with any of the electrodes in a direction that is perpendicular to the surface of the display panel.

In one or more embodiments, the lens may include a plurality of electrodes for determining a phase distribution associated with the lens. The lens may include (or may be divided into) a plurality of Fresnel zones. Each of the plurality of Fresnel zones may be configured to provide a phase modulation that is greater than or equal to 0 and is less than or equal to $2\pi$. Distances between immediately adjacent ones of the electrodes may have different values.

In one or more embodiments, the lens may include a plurality of electrodes for determining a phase distribution associated with the lens. The lens may include (or may be divided into) a plurality of Fresnel zones. All of the distances between immediately adjacent ones of the electrodes may be equal. At least one of the Fresnel zones may be configured to provide a phase modulation that is greater than $2\pi$. In one or more embodiments, the phase modulation may be less than or equal to $2.3 \times 2\pi$.

In one or more embodiments, the lens may include a plurality of electrodes for determining a phase distribution associated with the lens. The lens may include (or may be divided into) a plurality of Fresnel zones. All of the distances between immediately adjacent ones of the electrodes may be equal. At least one of the Fresnel zones is configured to provide a phase modulation that is less than 0. In one or more embodiments, the phase modulation is greater than or equal to $-0.3 \times 2\pi$.

An embodiment of the invention is related to a display device that may include a display panel configured to display an image. The display device may further include a liquid crystal Fresnel lens overlapping the display panel and comprising a plurality of Fresnel zones. The plurality of Fresnel zones may include a first Fresnel zone. The first Fresnel zone may be configured to provide a first phase modulation that is beyond a range of 0 to $2\pi$.

In one or more embodiments, the first phase modulation may be less than or equal to $2.3 \times 2\pi$ and is greater than or equal to $-0.3 \times 2\pi$.

In one or more embodiments, the plurality of Fresnel zones may further include a second Fresnel zone. The second Fresnel zone may be configured to provide a second phase modulation that is beyond the range of 0 to $2\pi$.

In one or more embodiments, all of the distances between immediately adjacent ones of the electrodes may be equal.

A display device according to an embodiment may include a display panel configured to display an image. The display device may further include a lens disposed in front of (or overlapping) the display panel and configured to have a user perceive images displayed by the display panel as three-dimensional images. The lens may be configured such that an incident light including a plurality of rays that are incident substantially parallel to an axis of the lens and pass through the display panel exhibits a first line spread function having at least two peaks corresponding to two positions on the display panel.

The at least two peaks may be substantially symmetrical with respect to an origin on the display panel corresponding to a center of the lens.

Most of the plurality of rays, e.g., except for a center ray passing through the center of the lens and outermost rays from the center of the lens, may be focused on the two positions on the display panel disposed opposite to each other with respect to a position on the display panel that corresponds to the center ray.

The lens may have an aspherical phase distribution function, and a phase distribution function of the lens may be represented by sum of a first function representing a spherical surface and a second function that is added to the first function to make the phase distribution function of the lens aspherical.

The at least two peaks of the first line spread function may be twice or greater than a maximum value of a second line spread function determined by a spherical phase distribution function that is represented only by the first function.

The first line spread function may have a full width at half maximum smaller than a full width at half maximum of the second line spread function.

The lens may include a Fresnel lens including a plurality of Fresnel zones. A phase distribution function of the lens may be symmetrical with respect to a center of the lens. A slope of the phase distribution function may have a value of about zero at the center of the lens. The slope of the phase distribution function may have a value at boundaries of the lens determined by a width of an outermost Fresnel zone of the lens. The slope of the phase distribution function may have a value at an inner position of the lens smaller than the value at the boundaries of the lens. The phase distribution function of the lens may be determined by minimizing a cost function.

The cost function may include a weighted crosstalk or a crosstalk.

A display device according to an embodiment may include a display panel configured to display an image. The display device may further include a Fresnel lens disposed in front of (or overlapping) the display panel and including a plurality of Fresnel zones. The lens may be configured to have a user perceive images displayed by the display panel as three-dimensional images. A phase distribution function of the lens may be symmetrical with respect to a center of the lens. A slope of the phase distribution function may have a value of about zero at the center of the lens. The values of the slope of the phase distribution function at boundaries of the lens may be determined by a width of an outermost Fresnel zone of the lens. The slope of the phase distribution function may have a value at an inner position of the lens smaller than the value at the boundaries of the lens. The phase distribution function of the lens may be determined by minimizing a weighted crosstalk or a crosstalk.

The phase distribution function may include sum of a quadratic function and cosine harmonics. Coefficients of terms of the cosine harmonics may be determined by minimizing a weighted crosstalk or a crosstalk.

A number of the terms in the cosine harmonics may be at least five.

At least one of the Fresnel zones may have a phase modulation beyond a range of zero to $2\pi$.

The phase modulation of the at least one of the Fresnel zones may be in a range from about $-\delta-$ to about $2\pi+\delta+$, where $-0.3 \times 2\pi \le \delta- \le +0.3 \times 2\pi$, and $-0.3 \times 2\pi \le \delta+ \le +0.3 \times 2\pi$.

The Fresnel lens may include a first substrate, a second substrate that faces (and/or overlaps) the second substrate, a plurality of control electrodes arranged in a regular pitch on the first substrate, a common electrode disposed on the second substrate, and a liquid crystal layer disposed between the first substrate and the second substrate. Boundaries of the Fresnel zones may correspond to (or may be aligned with) positions disposed between the control electrodes.

DETAILED DESCRIPTION OF THE EMBODIMENTS

Figure 1:
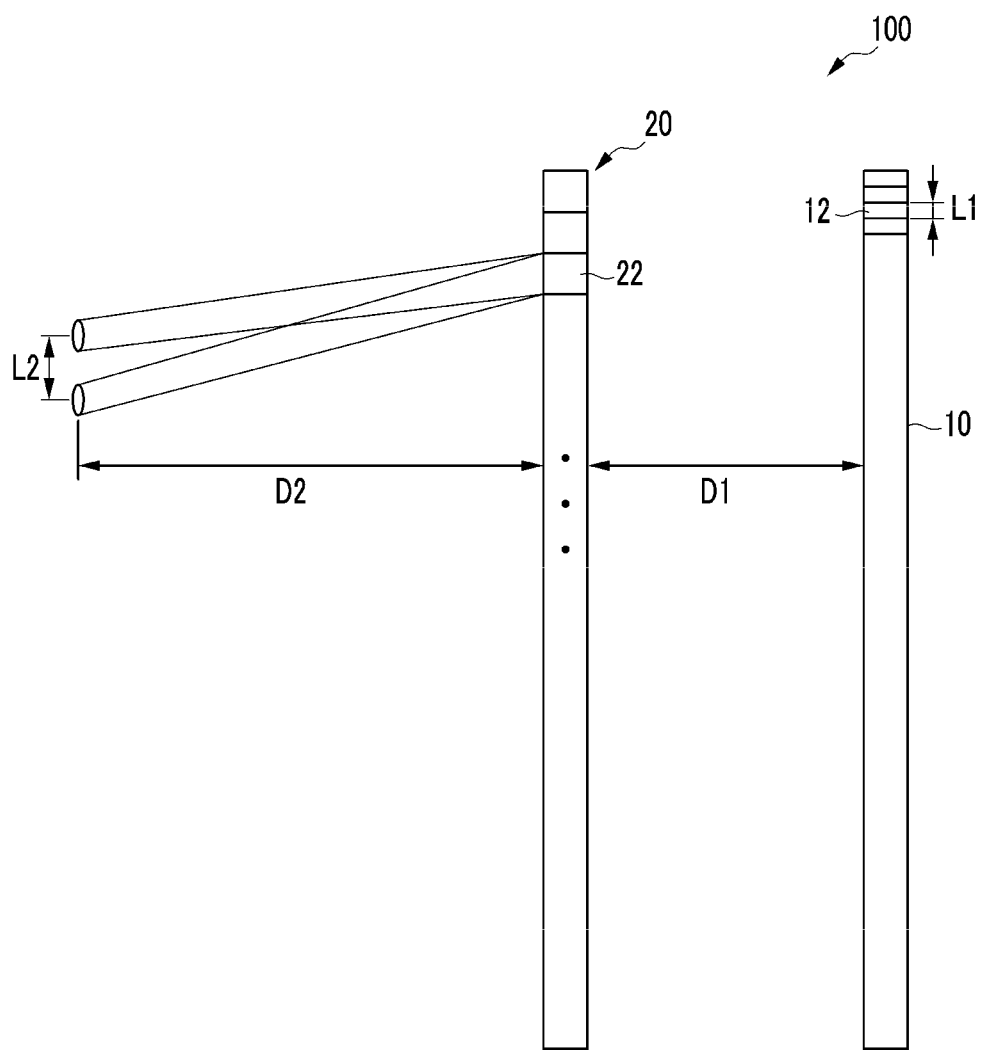
FIG. 1 is a schematic top view illustrating a portion of a display device according to one or more embodiments.

Aspects of the embodiments will be described more fully hereinafter with reference to the accompanying drawings. As those skilled in the art would realize, the described embodiments may be modified in various different ways, all without departing from the spirit or scope of the invention. In the drawing, parts having no relationship with the explanation may be omitted for clarity, and the same or similar reference numerals may designate the same or similar elements throughout the specification.

It will be understood that when a first element is referred to as being "on", "connected to", or "coupled to" a second element, it can be directly on, connected, or coupled to the other element, or one or more intervening elements may be present between the first elements and the second elements. In contrast, when a first element is referred to as being "directly on," "directly connected to", or "directly coupled to" a second element, there are no intervening elements between the first element and the second elements. Like numbers may refer to like elements throughout the description.

It will be understood that, although the terms first, second, etc. may be used herein to describe various elements, components, regions, layers, and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of the present invention.

Embodiments are described herein with reference to cross section illustrations that may be schematic illustrations of idealized embodiments. Variations from the shapes of the illustrations as a result, for example, of manufacturing techniques and/or tolerances, may be possible. Thus, embodiments described herein should not be construed as limited to the particular shapes of regions as illustrated herein but are to include deviations in shapes that result, for example, from manufacturing. For example, a region illustrated or described as flat may have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims set forth herein.

A display device according to an embodiment is described in detail with reference to FIG. 1 to FIG. 4. A display device according to this embodiment may be a three-dimensional (3D) display device or a 2D/3D switchable display device.

Figure 2:
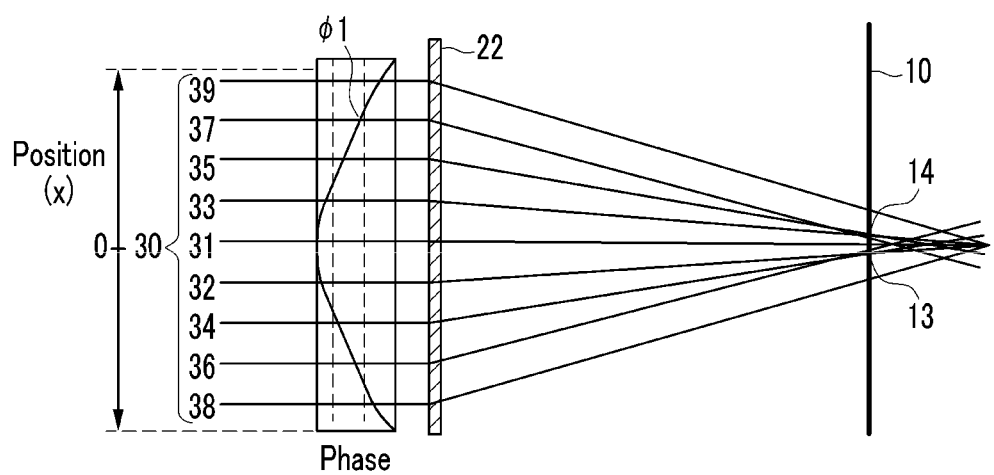
FIG. 2 is a schematic diagram illustrating a phase distribution of a lens of a display device in a top view according to one or more embodiments and paths of collimated light passing through the lens.
Figure 3:
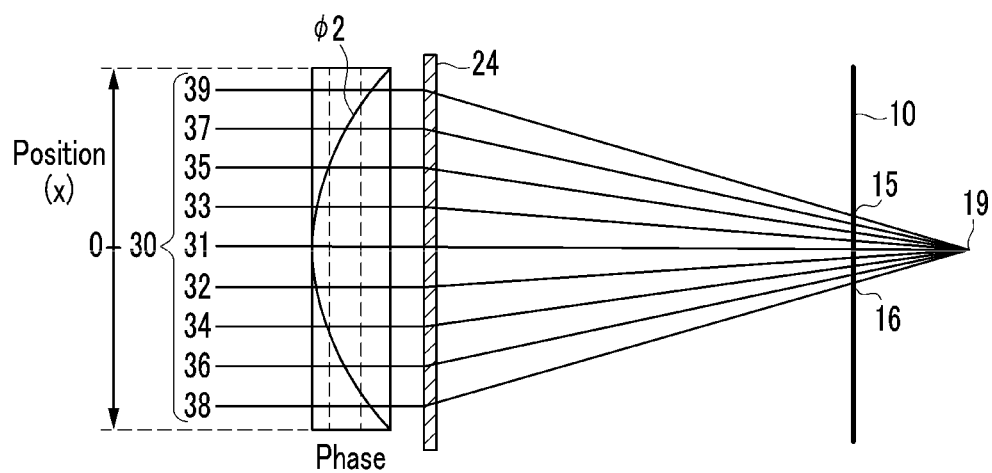
FIG. 3 is a schematic diagram illustrating a phase distribution of a lens of a display device according to a comparative example and paths of collimated light passing through the lens.
Figure 4:
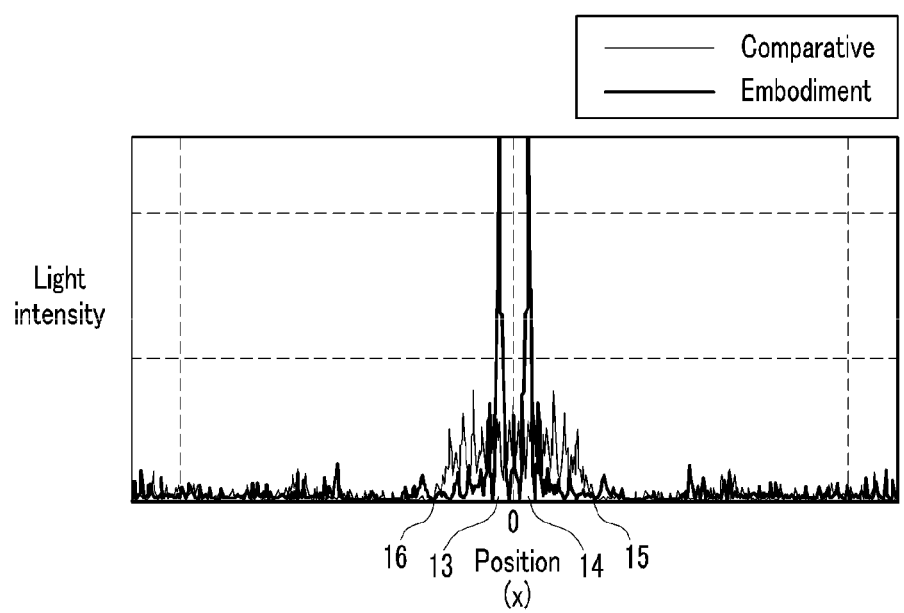
FIG. 4 is a graph illustrating intensity of light passing through a lens on a surface of a display panel according to each of an embodiment and a comparative example.

FIG. 1 is a schematic top view illustrating a portion of a display device according to one or more embodiments. FIG. 2 is a schematic diagram illustrating a phase distribution of a lens of a display device in a top view according to one or more embodiments and paths of collimated light passing through the lens. FIG. 3 is a schematic diagram illustrating a phase distribution of a lens of a display device according to a comparative example and paths of collimated light passing through the lens. FIG. 4 is a graph illustrating intensity of light passing through a lens on a surface of a display panel according to each of an embodiment and a comparative example.

Referring to FIG. 1, a display device 100 according to an embodiment includes a display panel 10 to display images and a lenticular lens 20 overlapping the display panel 10. The lenticular lens 20 may be disposed between the display panel 10 and a user of the display device 100.

The display panel 10 may include a flat panel display, for example, a liquid crystal display (LCD), an organic light emitting display (OELD), or a plasma display panel (PDP). The display panel 10 may include a plurality of pixels 12 that are arranged in rows and columns and are configured to display images. The display panel 10 may display images for different viewing regions in a way of space division and/or time division. For example, the display panel 10 may display images for a right eye and images for a left eye in alternate columns of pixels 12. The display panel 10 may be switched to display two-dimensional images.

The lenticular lens 20 includes a plurality of lenses 22 and may make a user perceive images displayed by the display panel 10 to be three-dimensional. For example, the lenticular lens 20 may separate images for different viewing regions on the display panel 10 by means of refraction and may send the separated images to the corresponding viewing regions.

A distance D1 between the display panel 10 and the lenticular lens 20 may be determined using a refractive index n of a medium disposed between the display panel 10 and the lenticular lens 20, an optimum viewing distance (OVD) D2, an interpupillary distance (IPD) L2, and a pitch L1 of the pixels 12. For example, $$D1 = nD2/(L2/L1).$$

Here, the interpupillary distance L2 indicates a distance between two eyes of human, more precisely, a distance between the centers of the pupils of the two eyes. The interpupillary distance L2 may be about 54 mm to about 66 mm for adults in general. The optimum viewing distance D2 indicates a distance between a user and the display device 100 at which the user can see clear images provided by the display device 100. The optimum viewing distance D2 may be determined based on a space where the display device 100 is located, watching habits of users, and so on.

Referring to FIG. 2, each lens 22 according to an embodiment provides an aspherical phase distribution φ1 for incident light, the aspherical phase distribution φ1 being substantially symmetrical with respect to a center of the lens 22.

It is assumed that a collimated incident light 30 including a plurality of rays 31-39 travelling substantially parallel to an axis of the lens 22 passes through the lens 22. The rays 31-39 may be refracted at different angles, depending on their corresponding positions on the lens 22, toward the display panel 10. The angles of refraction may be determined by the phase distribution φ1 given by the lens 22. According to an embodiment, most of the rays 31-39 passing through the lens 22 are substantially converged or substantially focused to at least two positions 13 and 14 on the display panel 10 at high concentrations.

A left-right direction is denoted as x-axis, and the center of the lens 22 is denoted as an origin (0), as illustrated in FIG. 2. When the phase distribution φ1 of the lens 22 is substantially symmetrical with respect to the center of the lens 22, the two positions 13 and 14 where the concentration of the rays 31-39 is relatively high may be disposed symmetrical with respect to the origin. In detail, the rays 32-37 of the rays 31-39, except the outermost rays 38 and 39 and the center ray 31, may be substantially concentrated on the two positions 13 and 14 of the display panel 10.

Referring to FIG. 3, a lens 24 according to a comparative example provides a spherical or parabolic phase distribution φ2 that is substantially different from the aspherical phase distribution φ1 illustrated in FIG. 2. The rays 31-39 of the collimated light 30 passing through the comparative lens 24 may be focused on a position (or a focus) 19 rear to the display panel 10, and may be relatively uniformly spread between two positions 15 and 16 that are disposed symmetrical with respect to the center of the display panel 10. A distance between the two positions 15 and 16 in the comparative example is greater than a distance between the two positions 13 and 14 where light concentration peaks are located in an embodiment illustrated in FIG. 2.

FIG. 4 illustrates light intensity on the display panel 10 according to each of the embodiment illustrated in FIG. 2 and the comparative example illustrated in FIG. 3. As illustrated in FIG. 4, according to the comparative example of FIG. 3, light intensity between the two positions 15 and 16 near the origin of the display panel 10 is higher than light intensity beyond positions 15 and 16, but is relatively more uniform than the light intensity according to the embodiment of FIG. 2 and is substantially lower than the peaks according to the embodiment of FIG. 2.

In the embodiment of FIG. 2, two sharp peaks are present near the two positions 13 and 14, respectively, near a point of the display panel 10 that corresponds to the center of the lens 22 given substantially the same incident light used in the comparative example of FIG. 3. The two peaks may be disposed symmetrical with respect to the center of the lens 22. In one or more embodiments, the light intensity at the peaks may be equal to or higher than twice the maximum intensity of light in the comparative example. A maximum distance between points that have light intensity of about a half of a peak intensity (referred to as "full width at half maximum" hereinafter) in one or more embodiments is much smaller than that in the comparative example. In general, a full width at half maximum for a function having a single peak is generally defined as a distance between two points that have values equal to a half of the peak value. In one or more embodiments, e.g., the embodiment illustrated in FIGS. 2 and 4, the light intensity has two or more peaks, and thus the number of the points that have values equal to about a half of peak values may be four or more. Therefore, a full width at half maximum in this embodiment denotes a distance between two farthest points among the four or more points.

Accordingly, the ratio of concentration on the display panel 10 for a collimated incident light is greater in this embodiment than in the comparative example, and thus a user may perceive the images provided by the display panel 10 more clearly in this embodiment.

In the comparative example of FIG. 3, the focus 19 could be disposed on or closer to the display panel 10 if the radius of curvature of the lens 24 were made smaller to draw the focus 19 of the lens 24 forward. Nevertheless, such a lens 24 with a reduced curvature radius may cause optical defects, such as increased light scattering, and may be difficult or costly to implement, due to limitations of manufacturing processes and/or limitations of materials.

Next, a lens of a display device according to one or more embodiments is described in detail with reference to FIG. 5 and FIG. 6.

Figure 5:
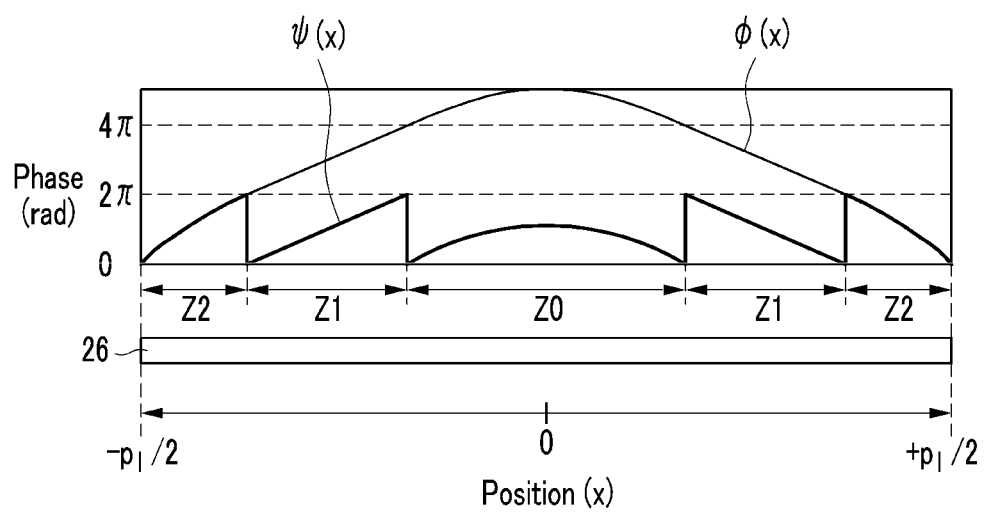
FIG. 5 is a graph illustrating a phase distribution function of a lens for use in a display device according to one or more embodiments.

FIG. 5 is a graph illustrating a phase distribution function of a lens for use in a display device according to one or more embodiments. FIG. 6 is a schematic sectional view illustrating a liquid crystal lens for use in a display device according to one or more embodiments.

Referring to FIG. 5, a lens 26 according to one or more embodiments is a Fresnel lens having a width p1 and divided into a plurality of zones Z0, Z1, and Z2 called Fresnel zones; each zone Z0, Z1, or Z2 provides a phase distribution (in radians, or rad) from about zero to about $2\pi$ depending on a position for incident light. A function representing the phase distribution given by the Fresnel lens 26 may be wrapped at boundaries of the zones Z0, Z1, and Z2. The function is referred to as a "wrapped phase distribution function" $\psi(x)$ hereinafter. Addition of $2n\pi$ (where n is a natural number) to values of the wrapped phase distribution function $\psi(x)$ may yield a nearly smooth function, which is referred to as an "original phase distribution function" $\phi(x)$ hereinafter.

Since the original phase distribution function $\phi$ and the wrapped phase distribution function $\psi$ may provide substantially the same phase change in a physical sense for an incident light, they are referred to as just "the phase distribution function" hereinafter when their exact distinction is not necessary.

In one or more embodiments, the Fresnel lens 26 is a liquid crystal lens.

Figure 6:
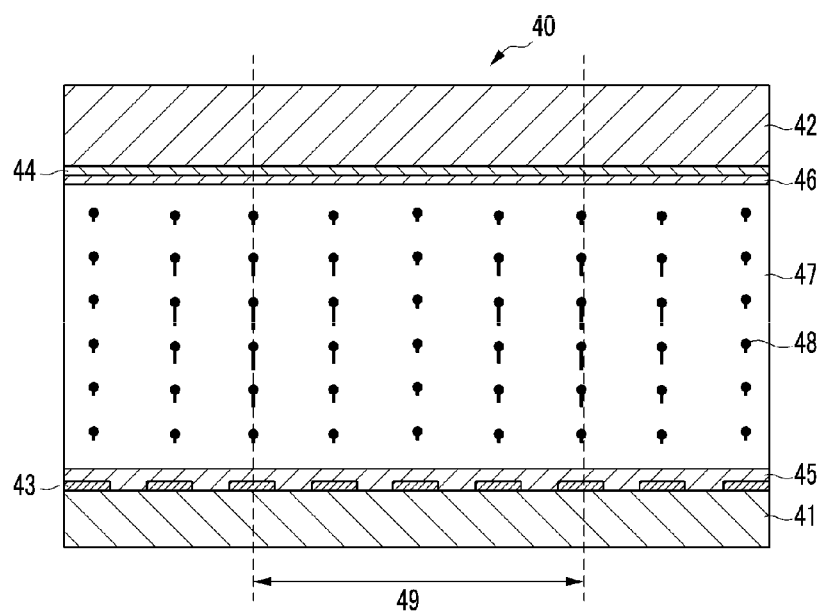
FIG. 6 is a schematic sectional view illustrating a liquid crystal lens for use in a display device according to one or more embodiments.

Referring to FIG. 6, a lenticular lens 40 according to one or more embodiments may be or may include a liquid crystal lenticular lens including one or more liquid crystal materials. The liquid crystal lenticular lens 40 includes, for example, a lower substrate (or a first substrate) 41 and an upper substrate (or a second substrate) 42 that overlap and face each other. Surfaces of the lower and upper substrates 41 and 42 that face each other are referred to as "inner surfaces." Surfaces opposite the inner surfaces are referred to as "outer surfaces." A plurality of control electrodes (or first electrodes) 43 are disposed on the inner surface of the lower substrate 41. A common electrode (or a second electrode) 44 is disposed on the inner surface of the upper substrate 42. A lower alignment layer (or a first alignment layer) 45 is disposed on exposed surfaces of the control electrodes 43 and the lower substrate 41, and an upper alignment layer (or a second alignment layer) 46 is disposed on the common electrode 44. A liquid crystal layer 47 is disposed between the lower alignment layer 45 and the upper alignment layer 46.

The lower and upper substrates 41 and 42 may include one or more transparent insulating materials, for example, glass and/or a plastic. The control electrodes 43 and the common electrode 44 may include one or more transparent conductive materials, for example, indium tin oxide (ITO) and/or indium zinc oxide (IZO). The liquid crystal layer 47 may have positive or negative refractive anisotropy, and may provide one or more of various types of alignment, for example, homogeneous alignment and/or homeotropic alignment.

The control electrodes 43 and the common electrode 44 may be supplied with external voltages, and orientations of liquid crystal molecules 48 in the liquid crystal layer 47 may be determined by an electric field that is produced by a potential difference between the control electrodes 43 and the common electrode 44. Since different orientations of the liquid crystal molecules 48 may cause different values of the refractive anisotropy of the liquid crystal layer 47, which in turn may cause different phase changes of incident light, a desired phase distribution may be obtained by adjusting voltages applied to the control electrodes 43 (and/or the voltage applied to the common electrode 44).

The liquid crystal lenticular lens 40 may include an array of a plurality of Fresnel lenses 49, and each of the Fresnel lenses 49 may (partially or completely) include a plurality of, for example, five or more of the control electrodes 43. Here, the number of the control electrodes 43 included in a Fresnel lens 49 is calculated in such a way that a control electrode 43 included in the Fresnel lens 49 partly but not entirely is added as one like a control electrode 43 fully included in the Fresnel lens 49. For example, FIG. 6 illustrates that the Fresnel lens 49 includes five control electrodes 43, wherein two control electrodes 43 are included in part.

The alignment layers 45 and 46 may help the liquid crystal molecules 48 align in a desired direction, and may be omitted.

Next, a method of obtaining a phase distribution function according to one or more embodiments is described in detail with reference to FIG. 7 as well as FIG. 5 and FIG. 6.

Figure 7:
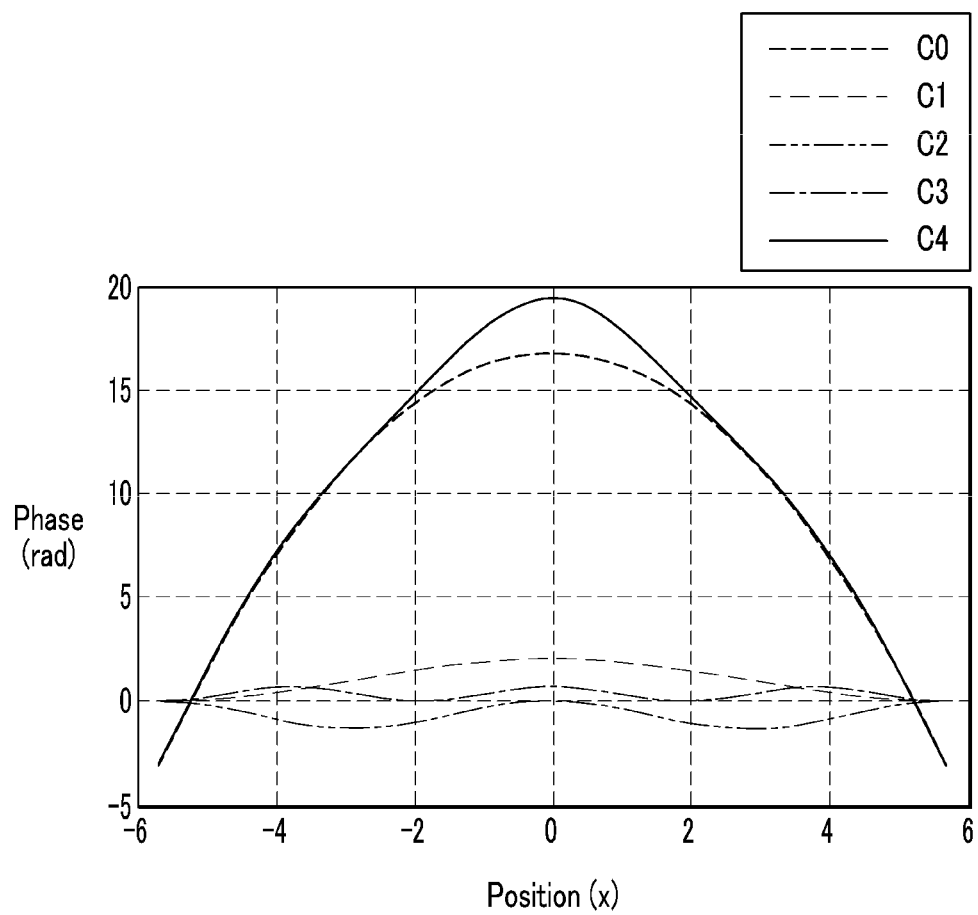
FIG. 7 is a graph illustrating a phase distribution function according to one or more embodiments.

FIG. 7 is a graph illustrating an exemplary phase distribution function according to one or more embodiments.

According to one or more embodiments, an original phase distribution function $\phi$ satisfying predetermined conditions is firstly obtained, and $2n\pi$ is subtracted from values of the original phase distribution function $\phi$ depending on a predetermined condition to obtain a wrapped phase distribution function $\psi$.

The original phase distribution function $\phi$ may satisfy the following conditions, wherein x is a coordinate value with respect to an origin that corresponds to a center of the lens 26, $p_l$ is a width of the lens, and $-p_l/2 \leq x < +p_l/2$:

First, the original phase distribution function $\phi$ is symmetrical with respect to the center of the lens 26. That is, $$\Phi(x) = \Phi(-x).$$

Second, a slope of the original phase distribution function $\phi$ corresponding to the center of the lens 26 has a value of about zero. That is, $$\Phi'(0) = 0,$$

where $$\Phi'(x) = \frac{d\Phi(x)}{dx}.$$

Third, the slope of the original phase distribution function $\phi$ at the boundaries of the lens 26 is determined by a minimum zone width. That is, $$\Phi'\left(\pm \frac{p_l}{2}\right) = \mp \frac{2\pi}{w_z},$$

where $w_z$ denotes the minimum zone width.

Fourth, the slope of the original phase distribution function $\phi$ at every point has a value equal to or smaller than the slope value at the boundaries. That is, $$|\Phi'(x)| \leq \mp \frac{2\pi}{w_z}.$$

Here, the minimum zone width indicates a minimum width that each of the Fresnel zones Z0, Z1, and Z2 may have. Each of the Fresnel zones Z0, Z1, and Z2 may have a width equal to or greater than the minimum zone width, and the width of an outermost Fresnel zone Z2 may be equal to the minimum zone width, for example.

The minimum zone width may be determined by a manufacturing condition of the lens 26. For example, referring to FIG. 6, where the lens 26 is a liquid crystal lens 49, the control electrodes 43 for changing the refractive index of the liquid crystal layer 47 may have a width equal to or greater than a predetermined value due to the technological constraints, and thus the widths of the Fresnel zones Z0, Z1 and Z2 may be limited (e.g., may have widths equal to or greater than respective minimum zone widths).

A combination of a quadratic function and a cosine harmonics may be taken as an example of a function satisfying the above-described conditions.

$$\Phi(x) = -2\pi \frac{x^2}{w_z p_l} + \sum_{m=1}^{M} a_m \cos\left(2m\pi \frac{x}{p_l}\right) \quad \text{(Eq. 1)}$$

Here, the first term of the quadratic function may substantially represent a conventional spherical or parabolic distribution, and remaining terms may modify the spherical distribution into an aspherical distribution.

For example, it is assumed that M=3. Referring to FIG. 7, when $w_z p_l = 1.0761498 \times 10^{-8}$ (m$^2$), $a_1 = 1$, $a_2 = 213$, and $a_3 = 112$, a curve C0 corresponding to the first term of the quadratic function in Eq. 1 and curves C1, C2, and C3 respectively corresponding to the remaining terms where m=1, 2, and 3 are added to yield a resultant curve C4. The slope of the resultant curve C4 may become relatively steep near the center of the lens compared with the initial curve C0.

Here, coefficients $a_m$ may be determined by minimizing a cost function on the display panel 10; the cost function may be, for example, "crosstalk" or "weighted crosstalk."

The crosstalk at a viewing point may be defined as a sum of noise image intensities divided by signal image intensity. The weighted crosstalk at the viewing point may be obtained by multiplying weights to respective noise image intensities, adding the weighted noise image intensities, and dividing the addition by signal image intensity. A noise at a viewing point (for example, a first viewing point) may be an image signal for another viewing point (for example, a second viewing point), and a weight assigned to the noise may be greater as the second viewing point is farther from the first viewing point.

An example of the minimization may include performing non-linear optimization using, for example, Nealder-Mead method. An example of commercially available tools is Nealder-Mead Simlex Method provided by MATLAB®.

In one or more embodiments, the order or the degree of the coefficients $a_1$ to $a_M$, i.e., M, may be firstly determined. Thereafter, arbitrary values may be assigned to $a_1$ to $a_M$ as initial values, and final values of $a_1$ to $a_M$ may be obtained by minimizing crosstalk or weighted crosstalk using the Nealder-Mead Simlex Method.

In order to reduce the time for obtaining the coefficients $a_1$ to $a_M$, the initial values used in the Nealder-Mead Simlex Method may be determined as follows.

First, a value range may be determined for each of the coefficients $a_1$ to $a_M$, and a plurality of values placed in a regular interval may be extracted from the value range, wherein the plurality of values is referred to as lattice values. For example, a value range from −1 to 1 for $a_1$ may be determined, and values may be extracted by an interval of 0.4 to obtain six lattice values of −1, −0.6, −0.2, +0.2, +0.6, and 1 for $a_1$.

The coefficients except for the lowest order coefficient, i.e., $a_1$, may be replaced with zeros, and the weighted crosstalk may be calculated for each of the extracted lattice values to find out a lattice value $a_{1o}$ that makes the weighted crosstalk have a minimum value, wherein $a_{1o}$ is referred to as "a minimizing lattice value" hereinafter.

Next, after the coefficient $a_1$ is replaced with the minimizing lattice value $a_{1o}$, and the coefficients $a_3$ to $a_M$ are replaced with zeros, the weighted crosstalk may be calculated for each of the lattice values for the coefficient $a_2$ to find out a minimizing lattice value $a_{2o}$ for the coefficient $a_2$.

In an analogous way, for the coefficient $a_m$ (m=3, ..., M−1), the coefficients $a_1$ to $a_{m-1}$ are replaced with the respective minimizing lattice values thereof, and the coefficients $a_{m+1}$ to $a_M$ are replaced with zeros. Thereafter, the weighted crosstalk may be calculated for each of the lattice values for the coefficient $a_m$ to find out a minimizing lattice value $a_{mo}$ for the coefficient $a_m$.

Next, the coefficients $a_1$ to $a_{m-1}$ are replaced with the respective minimizing lattice values thereof, and the weighted crosstalk may be calculated for each of the lattice values for the coefficient $a_M$ to find out a minimizing lattice value $a_{Mo}$ for the coefficient $a_M$.

The weighted crosstalk may be calculated again for a coefficient vector $(a_{1o}, \ldots, a_{Mo})$ including the minimizing lattice values of the coefficients $a_1$ to $a_M$ as components and for other coefficient vectors adjacent thereto, thereby finding out a minimizing coefficient vector that makes the weighted crosstalk have a minimum value. Here, the other coefficient vectors may be obtained by random number generation.

The components of the minimizing coefficient vector obtained as described above may be employed as initial values in the Nealder-Mead Simlex Method to reduce the time for performing minimization, compared with performing minimization using arbitrary initial values.

Next, a method of obtaining a wrapped phase distribution function $\psi$ by modifying an original phase distribution function $\phi$ according to one or more embodiments is described in detail with reference to FIG. 8 as well as FIG. 6.

Figure 8:
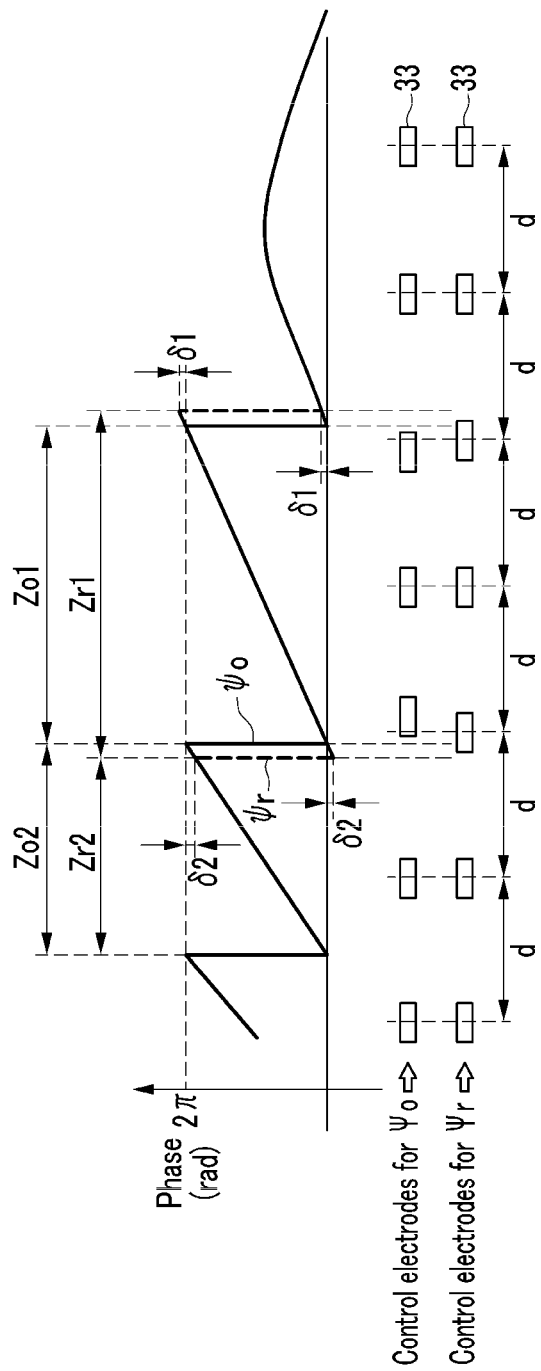
FIG. 8 is a graph schematically illustrating one or more lenses and one or more methods of obtaining a wrapped phase distribution function according to one or more embodiments.

FIG. 8 is a graph schematically illustrating one or more lenses and one or more methods of obtaining a wrapped phase distribution function according to one or more embodiments.

Referring to FIG. 8, when a value of an original phase distribution function $\phi$ is equal to or greater than $2\pi$, $2n\pi$ may be subtracted from the value to obtain a wrapped phase distribution function $\psi$ such that values of the wrapped phase distribution function $\psi$ is in a range equal to or greater than zero and smaller than $2\pi$, that is, $0 \leq \psi(x) < 2\pi$. Since the original phase distribution function $\phi$ is a continuous function, and the original phase distribution function $\phi$ gradually increases to a center (where x=0) and gradually decreases after passing through the center, the wrapped phase distribution function $\psi o$ may become suddenly zero to be wrapped at points where the values of the original phase distribution function $\phi$ are $2n\pi$, as illustrated in FIG. 8. In detail, when x<0, the wrapped phase distribution function $\psi o$ may abruptly drop to zero at points where the values of the original phase distribution function $\phi$ are $2n\pi$, and then may gradually increase again. When x>0, the wrapped phase distribution function $\psi o$ may decrease gradually to reach zero at points where the values of the original phase distribution function $\phi$ are $2n\pi$, and then may abruptly rise approximately to $2\pi$ to gradually decrease again.

In this way, Fresnel zones Zoi (where i=1, 2) may be obtained as illustrated in FIG. 8, for example. The wrapped phase distribution function $\psi o$ has a value of zero near boundaries of the Fresnel zones Zoi, and the Fresnel zones Zoi provides phase modulation equal to or greater than zero and smaller than (or equal to) $2\pi$.

In the liquid crystal lenticular lens 40 illustrated in FIG. 6, such a wrapped phase distribution function $\psi o$ may be obtained by adjusting widths of or distances between the control electrodes 43, or voltages applied to the control electrodes 43, for example. The width of the control electrodes 43 may be implemented according to a minimum value that can be realized by the current technology so that a desired phase distribution may be obtained in a minute level. In one or more embodiments, the control electrodes 43 may have a same width. In one or more embodiments, the control electrodes 43 may have different widths.

In one or more embodiments, for avoiding and/or minimizing distortion or the phrase distribution, the control electrodes 43 may be positioned so that the boundaries of the Fresnel zones Zoi may not overlap or be aligned with the control electrodes 43 in a direction perpendicular to inner surface of the first substrate 41, and thus.

the voltages applied to the control electrodes 43 may also be determined based on the determined positions of the control electrodes 43. In one or more embodiments, positions of the boundaries of the Fresnel zones may be adjusted, and the distances between the control electrodes 43 may have a constant value, so that the boundaries of the Fresnel zones Zoi may not overlap or be aligned with the control electrodes 43 in a direction perpendicular to inner surface of the first substrate 41.

Referring again to FIG. 8, when a boundary of a Fresnel zone Zoi obtained as described above is aligned with the control electrodes 43 arranged in a pitch d, the boundary may be moved left or right, by a predetermined amount. However, when a boundary of a Fresnel zone Zoi is disposed away from the control electrodes 43, the boundary may be remained. The boundaries newly obtained in this way may define a set of new Fresnel zones Zri of a wrapped phase distribution function $\psi r$. In one more embodiments, the moving distance of the zone boundaries may be determined so that the phase modulation given by each of the Fresnel zones Zri may lie in a range from about $-\delta^-$ to about $2\pi+\delta^+$ (where $-0.3 \times 2\pi \leq \delta^- \leq +0.3 \times 2\pi$ and $-0.3 \times 2\pi \leq \delta^+ \leq +0.3 \times 2\pi$). It is noted that the difference in the phase modulation between adjacent Fresnel zones Zri, e.g., Zr2 and Zr1, may be about $2\pi$ at the boundary between them.

For example, the phase modulation range of the Fresnel zone Zr1 may be from about $-\delta 2$ to about $2\pi+\delta 1$, and the phase modulation of the Fresnel zone Zr2 may range from about zero to about $2\pi+\delta 2$, as illustrated in FIG. 8. Each of $\delta 1$ and $\delta 2$ may lie in a range from about $-0.3 \times 2\pi$ to about $+0.3 \times 2\pi$.

The phase distribution functions ψo and ψr, the Fresnel zones Zoi and Zri, the number and the arrangement of the control electrodes 43, etc., illustrated in FIG. 8 are merely examples illustrating a method of obtaining a phase distribution function, and embodiments are not limited thereto. In one or more embodiments, the number of the control electrodes 43 in a Fresnel zone Zri or Zri may be two or more. In one or more embodiments, the width of a Fresnel zones Zoi or Zri may be multiples of the width of the control electrodes 43. In one or more embodiments, the width of a Fresnel zones Zoi or Zri may be multiples of the pitch of the control electrodes 43.

Next, a method of determining a phase distribution of a liquid crystal Fresnel lens according to one or more embodiments is described in detail with reference to FIG. 9 to FIG. 15.

Figure 9:
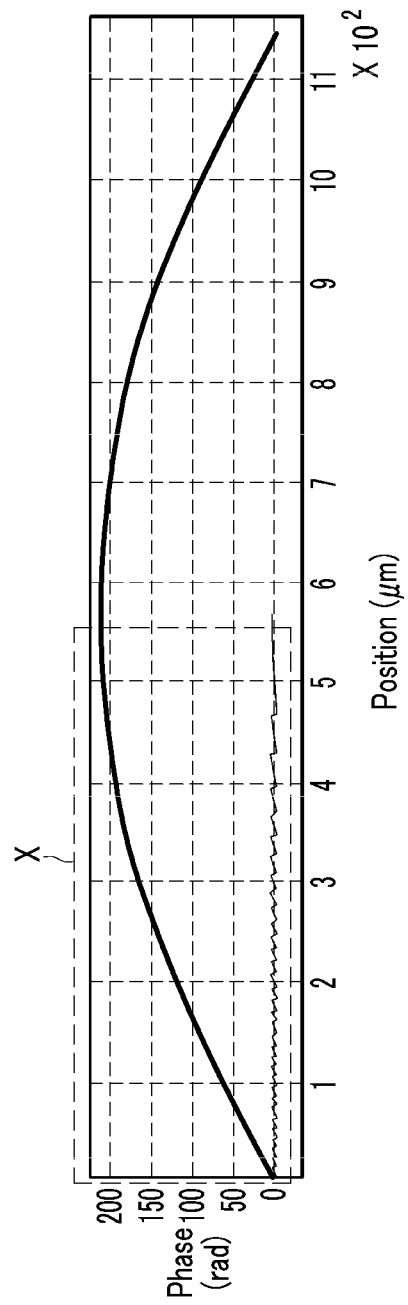
FIG. 9 is a graph illustrating an original phase distribution function according to one or more embodiments.
Figure 10:
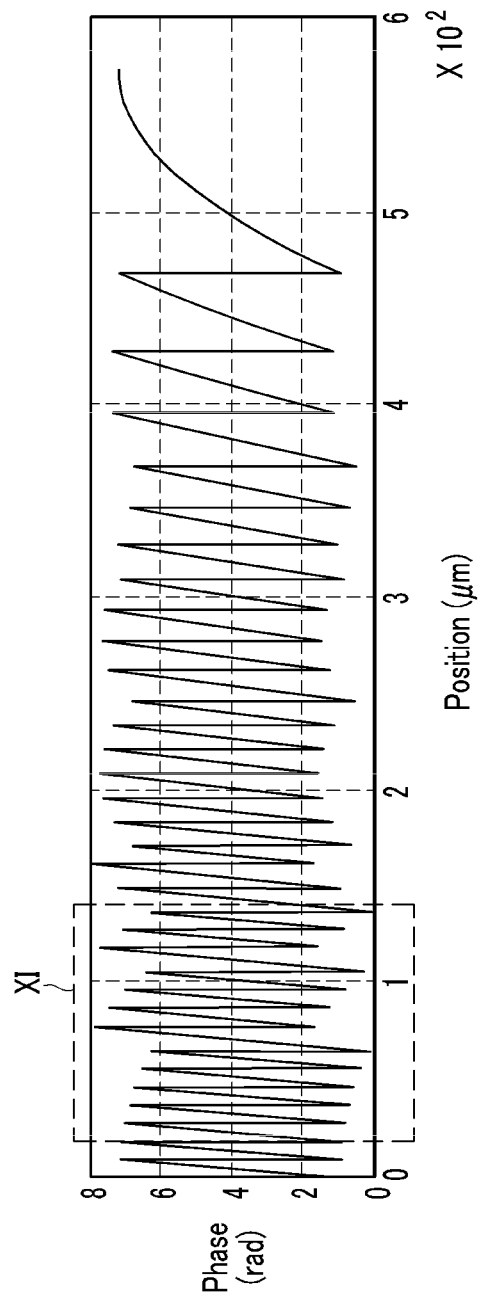
FIG. 10 is a graph illustrating a wrapped phase distribution function corresponding to a portion X surrounded by a dotted rectangle in the original phase distribution function illustrated in FIG. 9.
Figure 11:
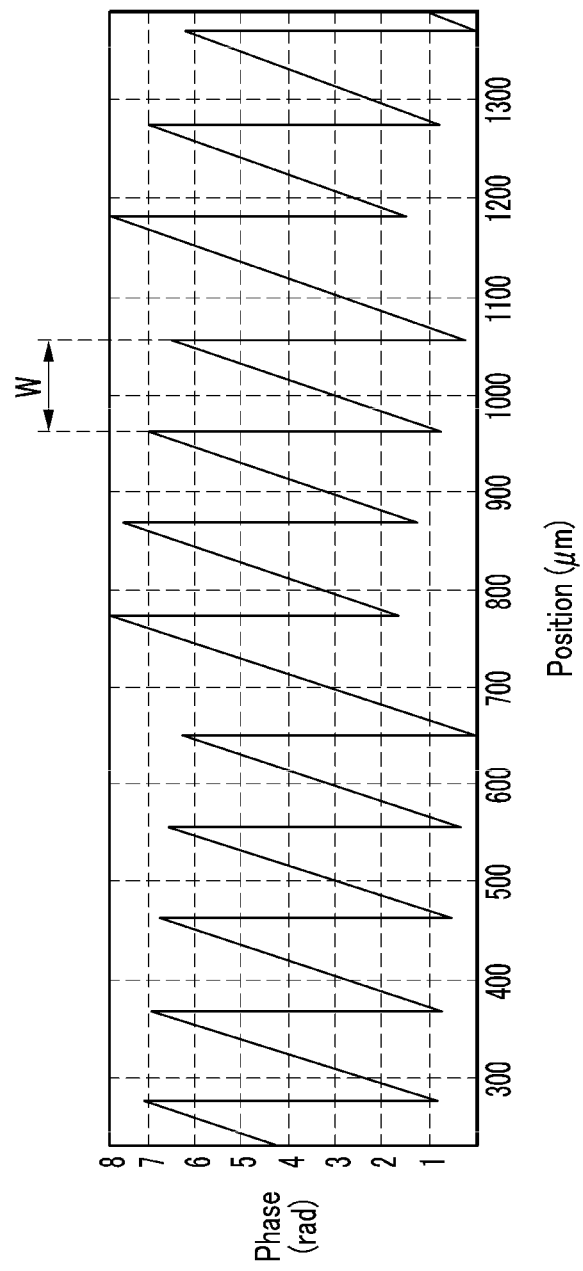
FIG. 11 is an expanded diagram of a portion XI surrounded by a dotted rectangle illustrated in FIG. 10.
Figure 12:
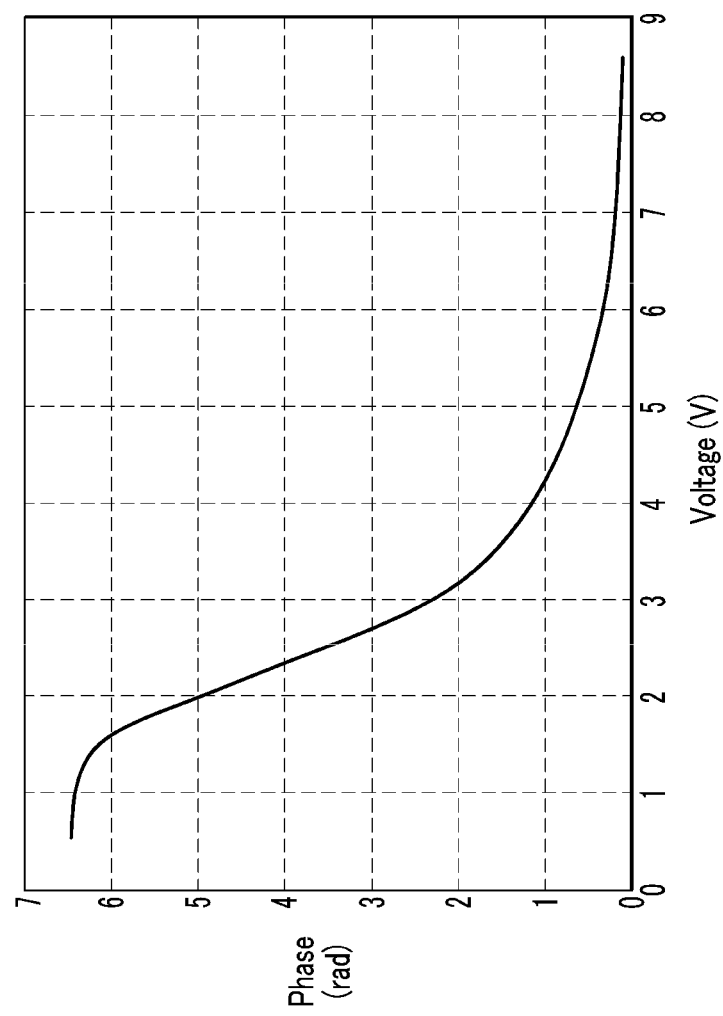
FIG. 12 is a graph illustrating a phase of a liquid crystal lens as a function of an applied voltage according to one or more embodiments.
Figure 13:
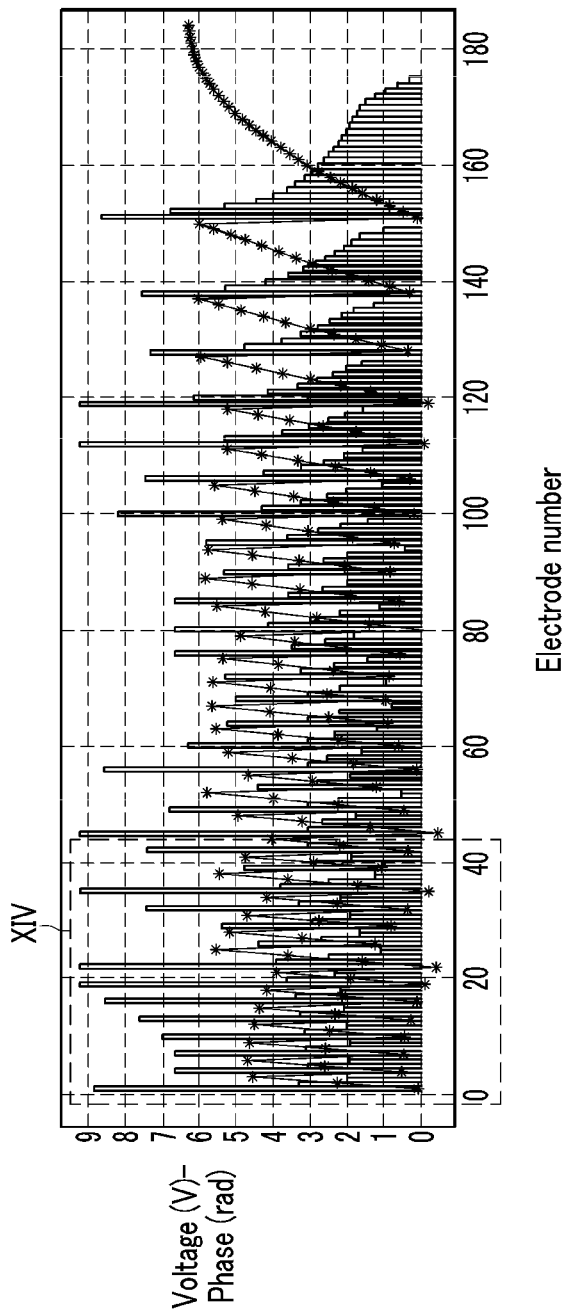
FIG. 13 is a graph illustrating phase values at positions where control electrodes are located and initial voltages applied to the control electrodes.
Figure 14:
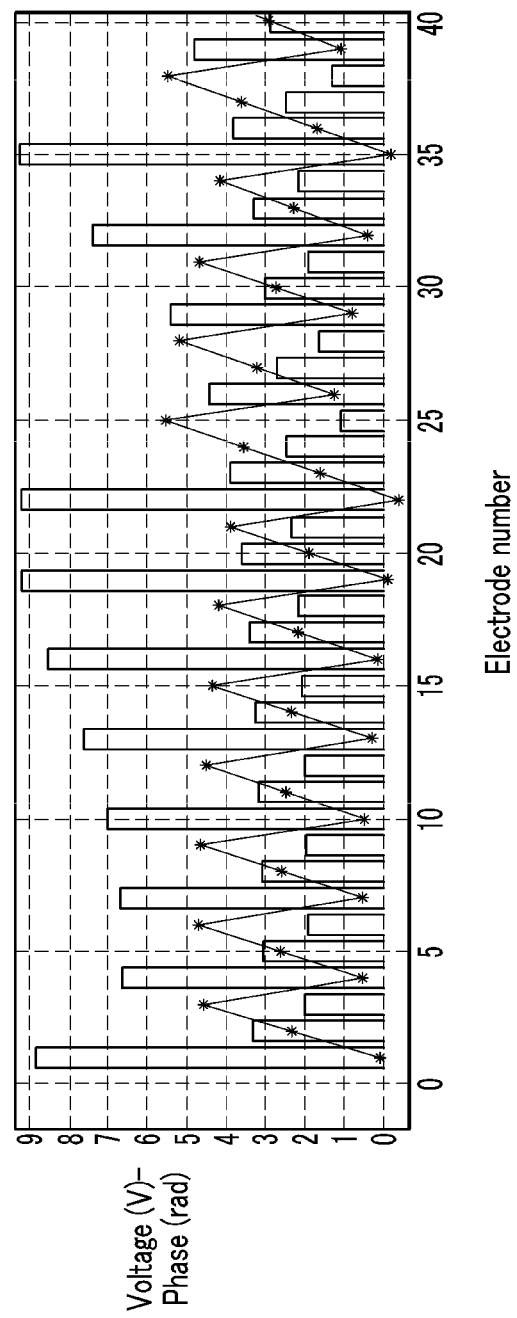
FIG. 14 is an expanded diagram of a portion XIV surrounded by a dotted rectangle illustrated in FIG. 13.
Figure 15:
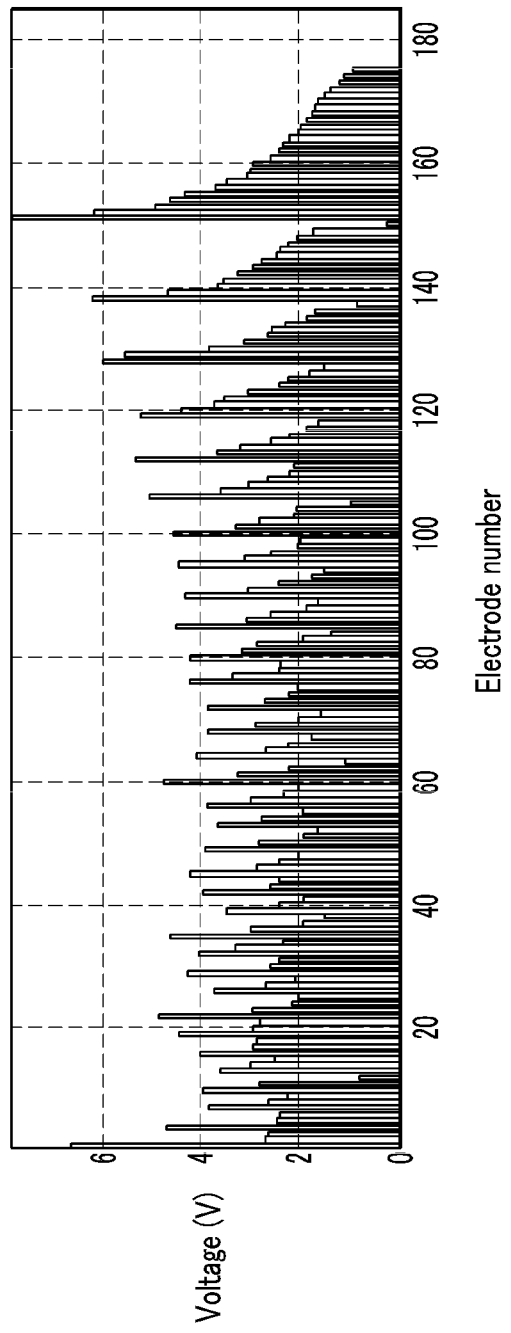
FIG. 15 is a graph illustrating finalized voltages applied to the control electrodes.

FIG. 9 is a graph illustrating an original phase distribution function according to one or more embodiments. FIG. 10 is a graph illustrating a wrapped phase distribution function corresponding to a portion X surrounded by a dotted rectangle in the original phase distribution function illustrated in FIG. 9. FIG. 11 is an expanded diagram of a portion XI surrounded by a dotted rectangle illustrated in FIG. 10. FIG. 12 is a graph illustrating a phase of a liquid crystal lens as a function of an applied voltage according to one or more embodiments. FIG. 13 is a graph illustrating phase values at positions where control electrodes are located and initial voltages applied to the control electrodes. FIG. 14 is an expanded diagram of a portion XIV surrounded by a dotted rectangle illustrated in FIG. 13. FIG. 15 is a graph illustrating finalized voltages applied to the control electrodes.

In one or more embodiments, in a liquid crystal lens 40 as illustrated in FIG. 6, the width and the pitch of the control electrodes 43 are about 1.5 μm and about 3 μm, respectively. In one or more embodiments, in Eq. 1 for obtaining an original phase distribution function, it is assumed that M=3 and $w_z p_f = 1.031328 \times 10^{-7}$ (m$^2$). Minimization of a weighted crosstalk lead to an original phase distribution function with $a_1 = 9.2236$, $a_2 = -2.7754$, and $a_3 = 8.1259 \times 10^{-7}$, which is illustrated in FIG. 9.

Next, a wrapped phase distribution function illustrated in FIG. 10 was obtained. Referring to the expanded view of FIG. 11, in one or more embodiments, the widths W of Fresnel zones are determined to be multiples of the pitch of the control electrodes 43.

In one or more embodiments, the liquid crystal lens 40 may substantially have a voltage-phase relation illustrated in FIG. 12. In one or more embodiments, initial voltages applied to the control electrodes 43 may be determined based on the voltage-phase relation, as illustrated in FIG. 13. The phases at the positions of the control electrodes 43 were denoted by asterisks (*) in FIG. 13 and FIG. 14. The initial voltages of the control electrodes 43 corresponding to the phases are denoted by bars in FIG. 13 and FIG. 14.

After applying the initial voltages to the liquid crystal lens 40, weighted crosstalk may be actually measured while displaying images on the display panel 10. Thereafter, the weighted crosstalk may be actually measured while slightly varying the voltages applied to the control electrodes 43, and a set of finalized voltages that minimize the measured weighted crosstalk may be determined, as illustrated in FIG. 15. The above-described adjustment of the voltages may be performed because an actual structure of the liquid crystal lens 40 may be different from an expected structure that is used in obtaining the original phase distribution function (due to process condition, etc.) and because the expected voltage-phase relation illustrated in FIG. 12 may be different from that of the actually manufactured liquid crystal lens 40. For example, although the voltage-phase relation of the actual liquid crystal lens 40 may depend on the position (x), the voltage-phase relation illustrated in FIG. 12 may be obtained without considering such a position dependence of the voltage-phase relation. The voltage adjustment may improve the characteristics of the liquid crystal lens 40.

Next, a display device according to an experimental example of one or more embodiments and a comparative example are described in detail with reference to FIG. 16 to FIG. 21.

A display device according to an experiment example of one or more embodiments may have a structure illustrated in FIG. 1 and may include a liquid crystal lenticular lens 40 includes Fresnel lenses illustrated in FIG. 5 and FIG. 6 as a lenticular lens 20. The optimum viewing distance D2 may be about 3.5 m, the interpupillary distance may be about 65.0 mm, the pitch of the lens 49 may be about 1.14600 mm, the width and the pitch of the control electrodes 43 of the liquid crystal lenticular lens 40 may be about 1.5 μm and about 3 μm, respectively, the width of an outermost Fresnel zone may be about 8.25 μm, and the width of a next outermost Fresnel zone may be about 9.0 μm.

In the experiment example of one or more embodiments, the coefficients $a_m$ of the original phase distribution function φ of the liquid crystal lenticular lens 40 may be optimized up to the fifth order. The coefficient values are shown in Table 1.

TABLE 2

| Coefficients | value | unit |
| --- | --- | --- |
| $w_z p_I$ | $11.0761498 \times 10^{-8}$ | m$^2$ |
| $a_1$ | 9.2307 | — |
| $a_2$ | −2.8114 | — |
| $a_3$ | $9.9597 \times 10^{-11}$ | — |
| $a_4$ | −0.6899 | — |
| $a_5$ | $3.8016 \times 10^{-11}$ | — |

In a comparative example, conditions may be substantially analogous to those in the experiment example of one or more embodiments, except that the original phase distribution function may be a quadratic function, that is, all coefficients $a_m$ may be zeros. A maximum slope of the original phase distribution function in the experiment example and the comparative example may be about 0.761.

The crosstalk in the experiment example is about 1.067, which is much smaller than the crosstalk of about 1.419 in the comparative example. The weighted crosstalk in the experiment is about 0.249, which is smaller than the crosstalk of about 0.279 in the comparative example.

Figure 19:
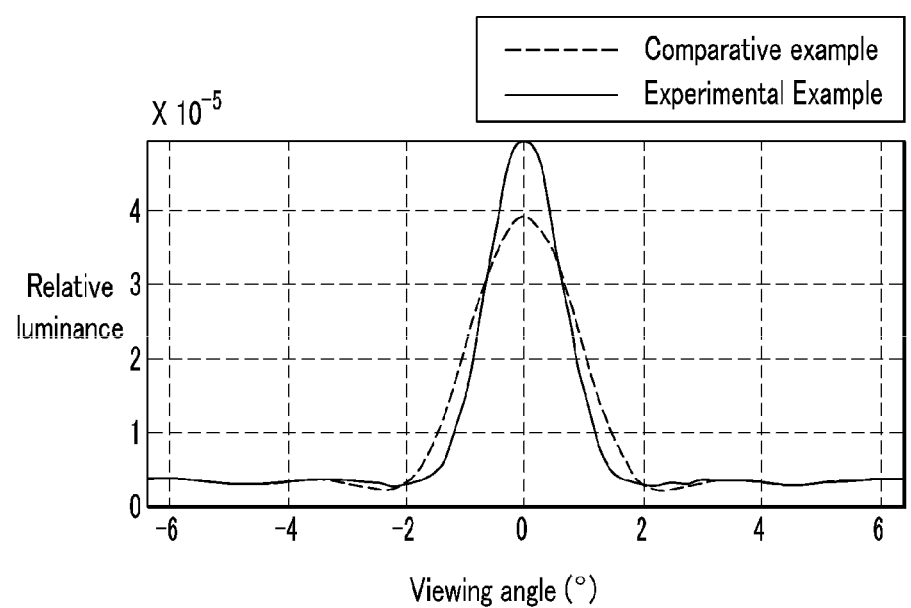
Figure 20:
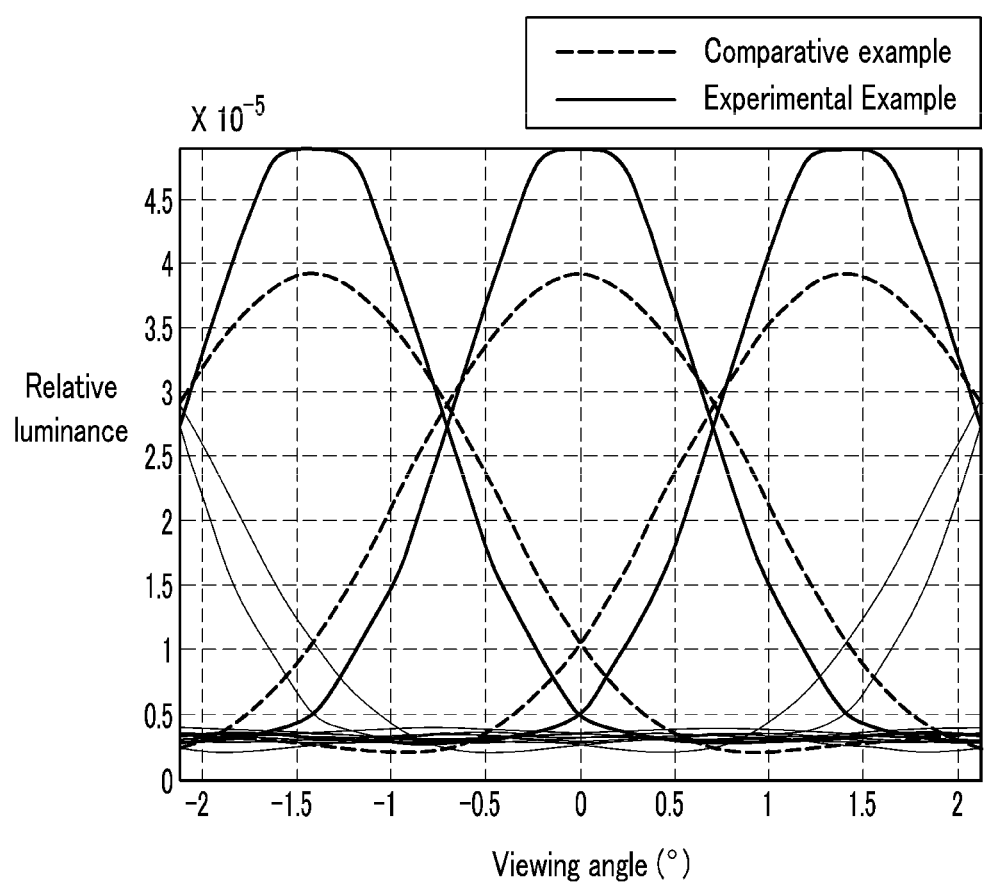
Figure 21:
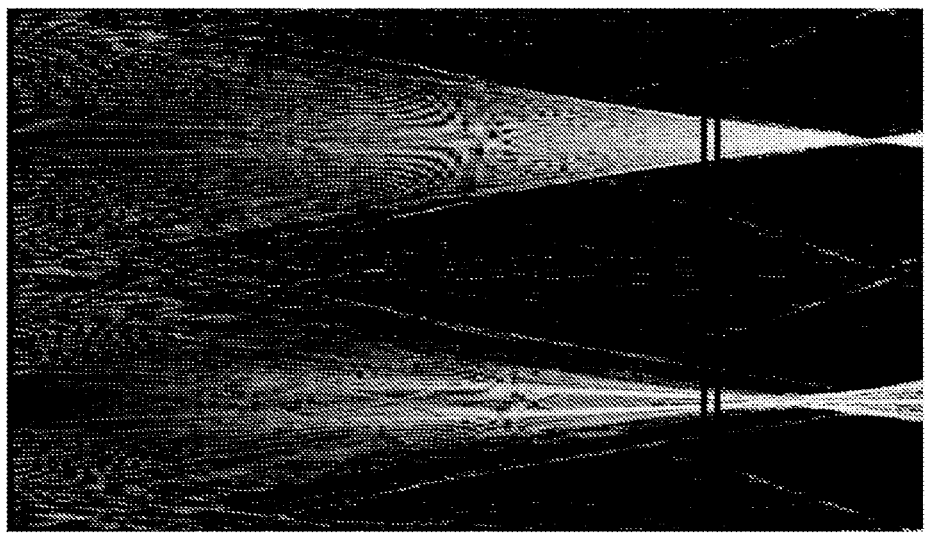
FIG. 21 is a photograph illustrating light propagation simulation of a display device according to each of an experimental example of one or more embodiments and a comparative example.

FIG. 16, FIG. 17, FIG. 18, FIG. 19, and FIG. 20 are graphs illustrating an original phase distribution function, a slope of the original phase distribution function, a line spread function, a single view profile (SVP), and a multi-view profile (MVP), respectively, according to each of the experimental example of one or more embodiments and the comparative example. FIG. 21 is a photograph illustrating light propagation simulation of a display device according to each of the experimental example of one or more embodiments and the comparative example.

Figure 18:
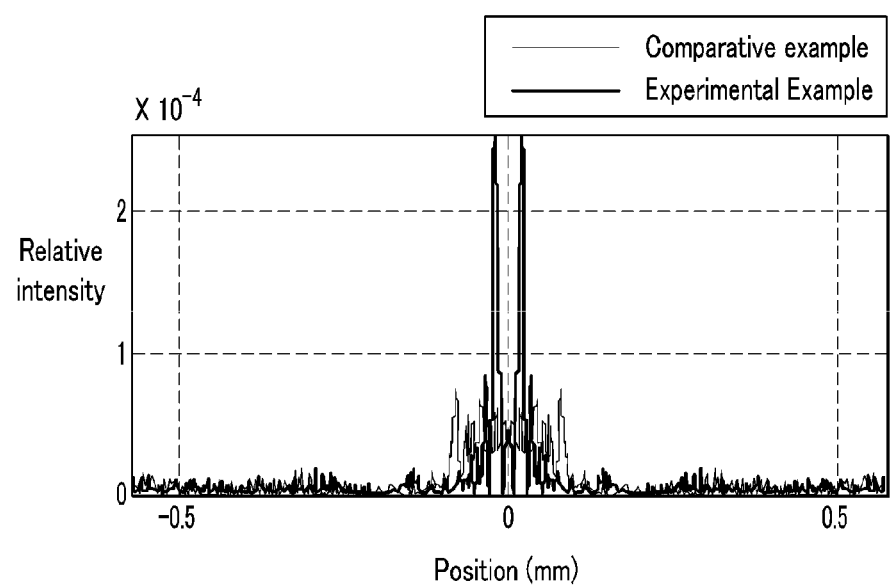

Here, the line spread function indicates a relative intensity of light measured on the display panel 10 when a collimated light is incident on the liquid crystal lens 22 and 24 as illustrated FIG. 2 and FIG. 3. The single view profile indicates a relative luminance of light as function of viewing angle from an origin that is a viewing point immediately in front of a pixel when all pixels except for the pixel are turned off. The multi-view profile indicates relative luminance distribution of images at various points as function of viewing angle. The values of the line spread function, the single view profile, and the multi view profile respectively illustrated in FIG. 18, FIG. 19, and FIG. 20 are normalized. The unit of the vertical axis in FIG. 18 is $10^5$/mm, and the unit of the vertical axis in FIG. 19 is 8980/°.

Figure 16:
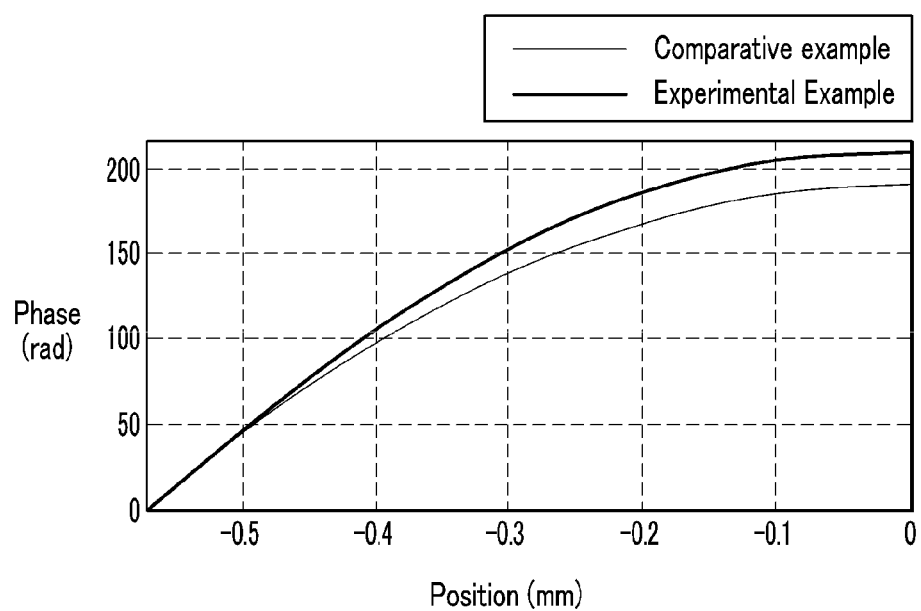
FIG. 16, FIG. 17, FIG. 18, FIG. 19, and FIG. 20 are graphs illustrating an original phase distribution function, a slope of the original phase distribution function, a line spread function, a single view profile (SVP), and a multi view profile (MVP), respectively, according to each of an experimental example of one or more embodiments and a comparative example.

Referring to FIG. 16, the original phase distribution function of the experimental example becomes greater than that of the comparative example as it goes to the center of the lens 49.

Figure 17:
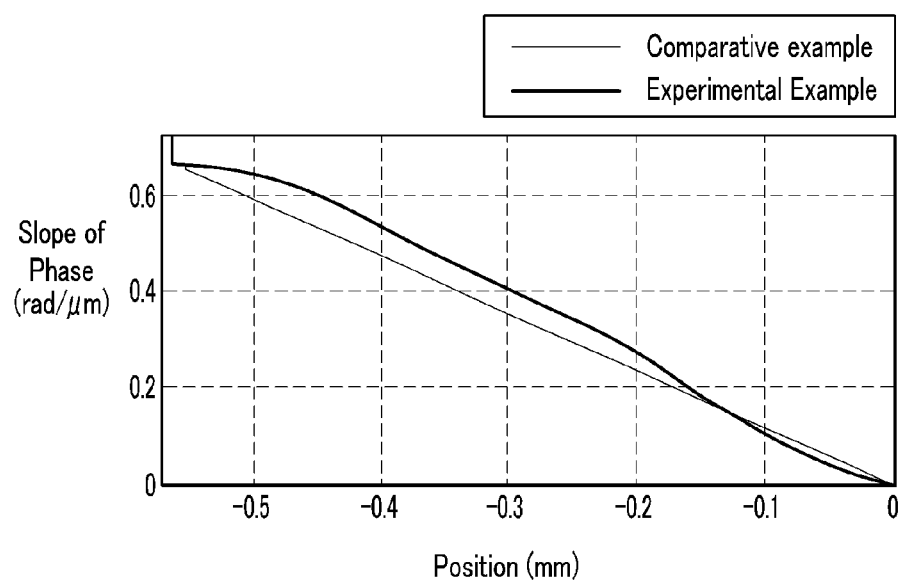

Referring to FIG. 17, the slope of the original phase distribution function is smaller in the experimental example than in the comparative example from the center of the lens 49 to a position of about 0.13 mm, but the slope is greater in the experimental example than in the comparative example from the position of about 0.13 mm to a boundary of the lens 49.

Referring to FIG. 18, the line spread function of the experimental example exhibits two sharp peaks at positions near an origin of the position coordinate corresponding to the center of the lens 49. In contrast, the line spread function of the comparative example exhibits substantially lower peaks near the origin of the position coordinate corresponding to the center of a lens. The peak values of the line spread function in the experimental example may be about twice or greater than twice the maximum value in the comparative example. The standard deviation in the experimental example is about 0.206 and is greater than the standard deviation of about 0.201 in the comparative example. The full width at half maximum in the experimental example is much narrower than that in the comparative example. In the experimental example, the light spread function may have a third peak positioned between the two sharp peaks. In one or more embodiments, at least one of the two sharp peaks may have a peak value that is greater than or equal to twice a peak value associated with the third peak. In one or more embodiments, at least one of the two sharp peaks may have a peak value that is greater than or equal to three times a peak value associated with the third peak. In one or more embodiments, at least one of the two sharp peaks may have a peak value that is greater than or equal to four times a peak value associated with the third peak.

Referring to FIG. 19 and FIG. 20, the single view profile and the multi-view profile have peak values greater in the experimental example than in the comparative example, and have full widths at half maximum narrower in the experimental example than in the comparative example. The standard deviation of the single view profile illustrated in FIG. 19 is about 2.314 in the experimental example, which is greater than about 2.276 in the comparative example.

FIG. 21 is a simulation photograph that illustrates propagation paths of collimated lights incident on the liquid crystal lenses 22 and 24 illustrated in FIG. 3 and FIG. 2. Two vertical bands in the right portion of the photograph indicate the left and right boundaries of the display panel 10. The upper portion of the photograph illustrates the light propagation in the comparative example, while the lower portion of the photograph illustrates the light propagation in the experimental example. In the comparative example, light rays are focused at a position behind the display panel 10 and spread comparatively uniformly in a relatively long distance (or relatively wide range) on the display panel 10. In the experimental example, most light rays are substantially focused at two points spaced apart by a relatively short distance on the display panel 10, and get closer and then spread again behind the display panel 10.

As described above, the experimental example provides clearer images than the comparative example.

Next, a display device according to each of an experimental example of one or more embodiments and a comparative example are described in detail with reference to FIG. 22 to FIG. 27.

A display device according to an experiment example may have a structure illustrated in FIG. 1 and may include a liquid crystal lenticular lens 40 includes Fresnel lenses illustrated in FIG. 5 and FIG. 6 as a lenticular lens 20. The optimum viewing distance D2 may be about 3.5 m, the interpupillary distance may be about 65.0 mm, the pitch of the lens 49 may be about 1.14600 mm, the width and the pitch of the control electrodes 43 of the liquid crystal lenticular lens 40 may be about 1.5 μm and about 3 μm, respectively, the width of an outermost Fresnel zone was about 8.25 μm, and the width of a next outermost Fresnel zone may be about 9.0 μm.

In the experiment example of one or more embodiments, the coefficients $a_m$ of the original phase distribution function $\phi$ of the liquid crystal lenticular lens 40 may be optimized up to the ninth order. The coefficient values are illustrated in Table 2.

TABLE 2

| Coefficients | value | unit |
| --- | --- | --- |
| $w_z p_l$ | $1.031414572650600 \times 10^{-8}$ | m² |
| $a_1$ | 11.3247808928439 | — |
| $a_2$ | $-3.06027770690116$ | — |
| $a_3$ | $-8.20642654489219 \times 10^{-11}$ | — |
| $a_4$ | $-0.677307456625128$ | — |
| $a_5$ | $-3.54659984842954 \times 10^{-12}$ | — |
| $a_6$ | $2.97773096581639 \times 10^{-14}$ | — |
| $a_7$ | $2.83219254243165 \times 10^{-13}$ | — |
| $a_8$ | 0 | — |
| $a_9$ | 0 | — |

In a comparative example, conditions may be substantially analogous to those in the experiment example of one or more embodiments, except that the original phase distribution function may be a quadratic function, that is, all coefficients $a_m$ may be zeros.

A maximum slope of the original phase distribution function, the crosstalk, and the weighted crosstalk in these examples may be substantially analogous to those in one or more of the above-described examples of FIGS. 16-21. That is, the maximum slope of the original phase distribution function in the experiment and the comparative example may be about 0.761, the crosstalk and the weighted crosstalk in the experiment may be about 1.067 and about 0.249, respectively, and the crosstalk and the weighted crosstalk in the comparative example may be about 1.419 and about 0.279, respectively.

FIG. 22, FIG. 23, FIG. 24, FIG. 25, and FIG. 26 are graphs illustrating an original phase distribution function, a slope of the original phase distribution function, a line spread function, a single view profile, and a multi-view profile, respectively, according to each of the experimental example of one or more embodiments and the comparative example. FIG. 27 is a photograph illustrating light propagation simulation of a display device according to each of the experimental example of one or more embodiments and the comparative example.

Figure 24:
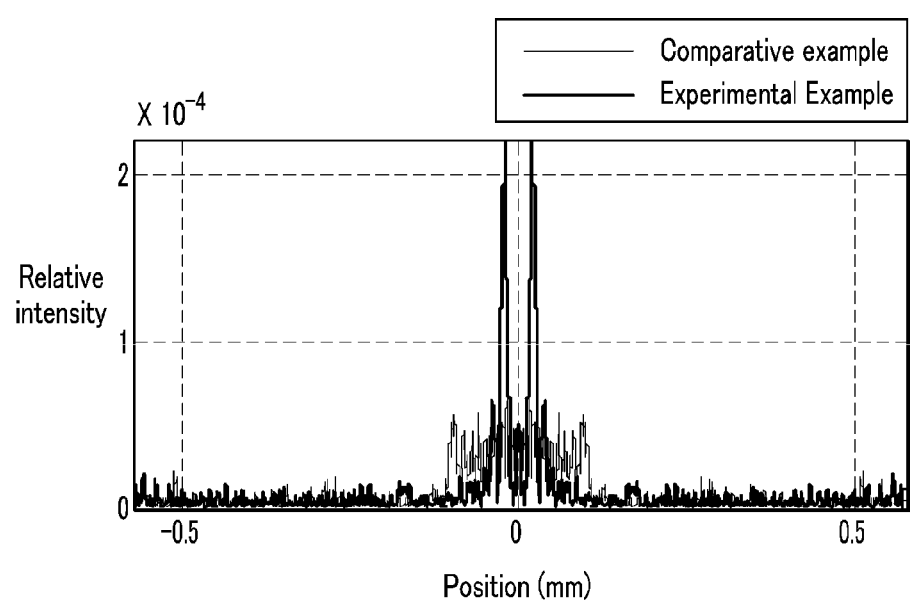
Figure 25:
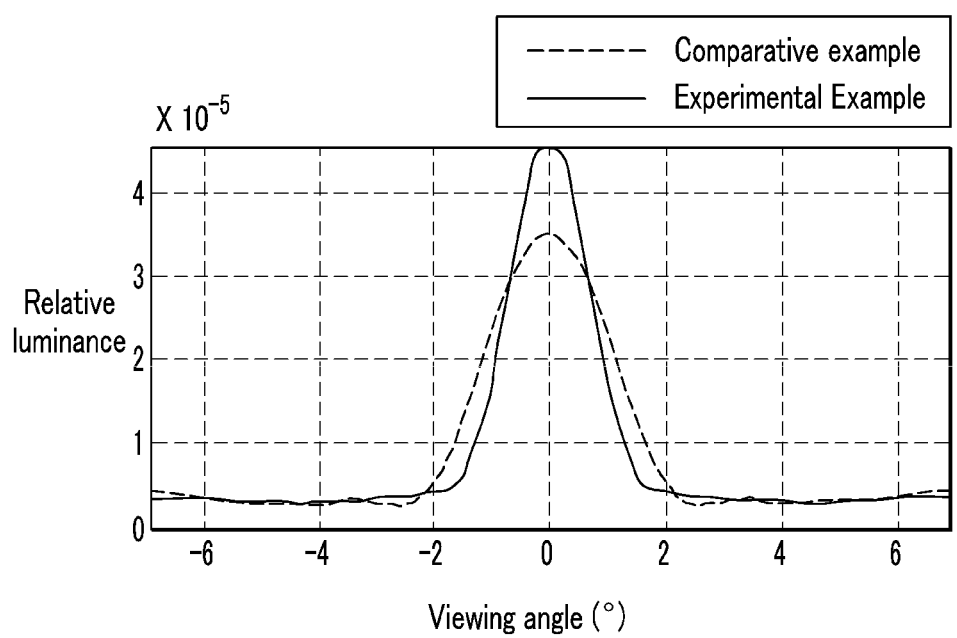
Figure 26:
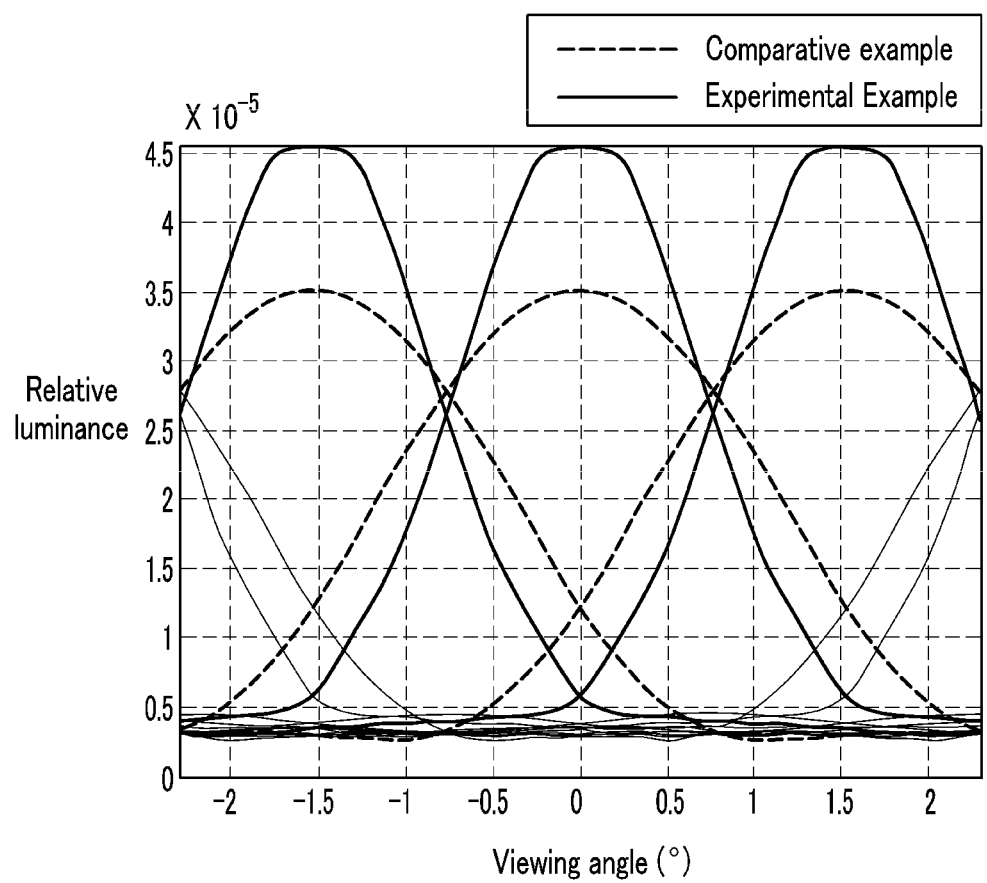
Figure 27:
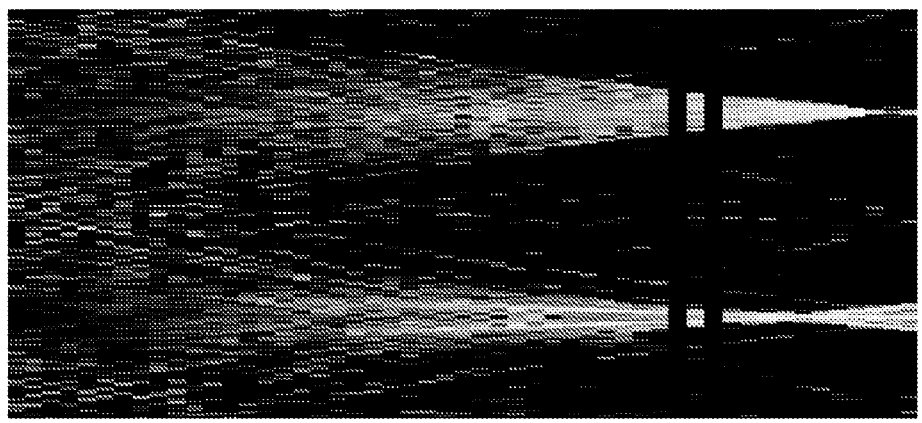
FIG. 27 is a photograph illustrating light propagation simulation of a display device according to each of an experimental example according to one or more embodiments and a comparative example.

The values of the line spread function, the single view profile, and the multi-view profile respectively illustrated in FIG. 24, FIG. 25, and FIG. 26 are normalized. The unit of the vertical axis in FIG. 24 is $10^5$/mm, and the unit of the vertical axis in FIG. 25 is 8980/°.

Figure 22:
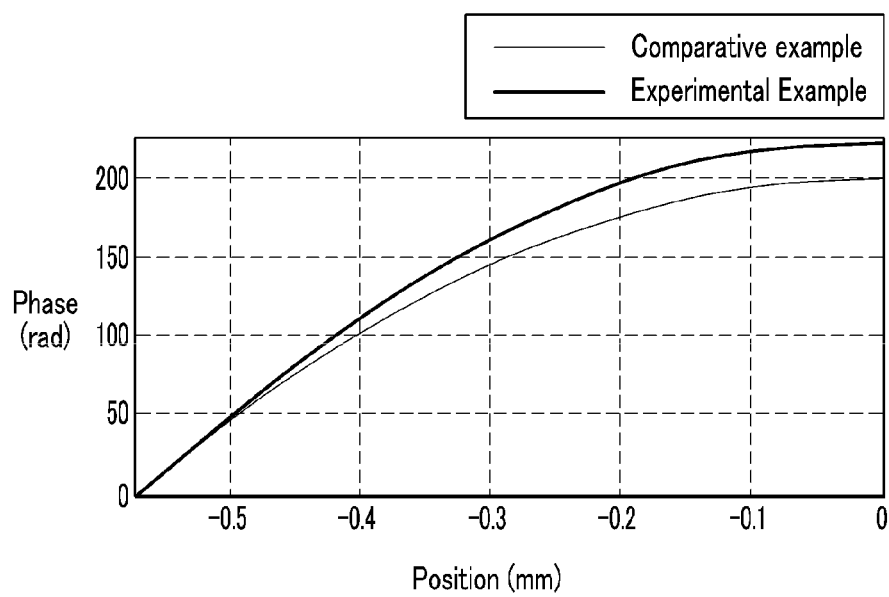
FIG. 22, FIG. 23, FIG. 24, FIG. 25, and FIG. 26 are graphs illustrating an original phase distribution function, a slope of the original phase distribution function, a line spread function, a single view profile, and a multi view profile, respectively, according to each of an experimental example of one or more embodiments and a comparative example.

Referring to FIG. 22, the original phase distribution function of the experimental example becomes greater than that of the comparative example as it goes to the center of the lens 49.

Figure 23:
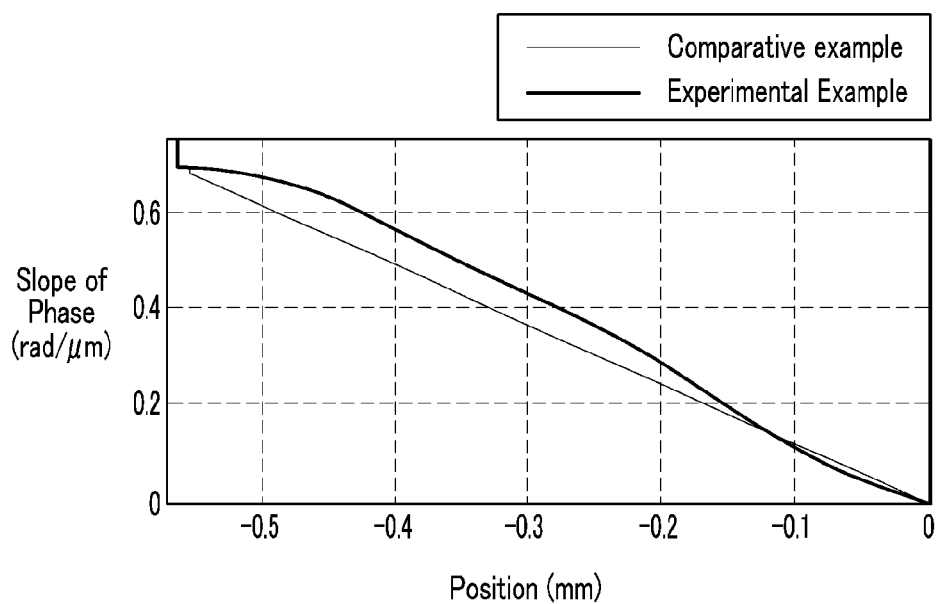

Referring to FIG. 23, the slope of the original phase distribution function is smaller in the experimental example than in the comparative example from the center of the lens 49 to a position of about 0.13 mm, but the slope is greater in the experimental example than in the comparative example from the position of about 0.13 mm to a boundary of the lens 49.

Referring to FIG. 24, the line spread function of the experimental example exhibits two sharp peaks at positions near an origin of the position coordinate corresponding to the center of the lens 49. In contrast, the line spread function of the comparative example exhibits substantially lower peaks near the origin of the position coordinate corresponding to the center of a lens. The peak values of the line spread function in the experimental example may be about twice or greater than twice the maximum value in the comparative example. The standard deviation in the experimental example is about 0.214 and is greater than the standard deviation of about 0.207 in the comparative example. The full width at half maximum in the experimental example is much narrower than that in the comparative example. In the experimental example, the light spread function may have a third peak positioned between the two sharp peaks. In one or more embodiments, at least one of the two sharp peaks may have a peak value that is greater than or equal to twice a peak value associated with the third peak. In one or more embodiments, at least one of the two sharp peaks may have a peak value that is greater than or equal to three times a peak value associated with the third peak. In one or more embodiments, at least one of the two sharp peaks may have a peak value that is greater than or equal to four times a peak value associated with the third peak.

Referring to FIG. 25 and FIG. 26, the single view profile and the multi-view profile have peak values greater in the experimental example than in the comparative example, and have full widths at half maximum narrower in the experimental example than in the comparative example. The standard deviation of the single view profile illustrated in FIG. 25 is about 2.590 in the experimental example, which is greater than about 2.521 in the comparative example.

FIG. 27 is a simulation photograph that illustrates propagation paths of collimated lights incident on the liquid crystal lenses 22 and 24 illustrated in FIG. 3 and FIG. 2. Two vertical bands in the right portion of the photograph indicate the left and right boundaries of the display panel 10. The upper portion of the photograph illustrates the light propagation in the comparative example, while the lower portion of the photograph illustrates the light propagation in the experimental example. In the comparative example, light rays are focused at a position disposed behind the display panel 10 and they spread comparatively uniformly in a relatively long distance (or relatively wide range) on the display panel 10. In the experimental example, most light rays are substantially focused at two points spaced apart by a relatively short distance on the display panel 10, and get closer and then spread again behind the display panel 10.

As described above, the experimental example provides clearer images than the comparative example.

While this disclosure has been described in connection with what is presently considered to be practical exemplary embodiments, it is to be understood that the invention is not limited to the disclosed embodiments. The invention is intended to cover various modifications and equivalent arrangements included within the spirit and scope of the appended claims.

DESCRIPTION OF SYMBOLS

10: display panel
20, 40: lenticular lens
22: lens
41: lower substrate
42: upper substrate
43: control electrode
44: common electrode
45: lower alignment layer
46: upper alignment layer
47: liquid crystal layer
48: liquid crystal molecule
49: Fresnel lens
100: display device

What is claimed is:

1. A display device comprising:
a display panel configured to display an image; and
a lens overlapping the display panel and configured to refract at least a portion of a collimated light that includes a center ray, a first outermost ray positioned at a first boundary of the collimated light, a second outermost ray positioned at a second boundary of the collimated light, a first plurality of rays positioned between the first outermost ray and the center ray, and a second plurality of rays positioned between the second outermost ray and the center ray,
wherein the lens is configured to concentrate the first plurality of rays to a first position on a surface of the display panel such that the first position has a first light intensity,
wherein the lens is configured to concentrate the second plurality of rays to a second position on the surface of the display panel such that the second position has a second light intensity,
wherein the lens is configured to transmit at least the center ray to a third position on the surface of the display panel such that the third position has a center light intensity, and
wherein each of the first light intensity and the second light intensity is substantially greater than the center light intensity.

2. The display device of claim 1, wherein the first position and the second position are substantially symmetrical with respect to the third position.

3. The display device of claim 1, wherein each of the first light intensity and the second light intensity is greater than or equal to twice the center intensity.

4. The display device of claim 1, wherein each of the first light intensity and the second light intensity is greater than or equal to three times the center intensity.

5. The display device of claim 1, wherein the lens has a phase distribution having a shape that does not conform to any arc of any circle.

6. The display device of claim 1, wherein the lens has a phase distribution that is associated with a phase distribution function, the phase distribution function including a sum of a first term and a plurality of additional terms, the first term being a quadratic function of a position with respect to a center of the lens, each of the plurality of additional terms having a non-zero coefficient.

7. The display device of claim 6, wherein each of the plurality of additional terms is a cosine function.

8. The display device of claim 6, wherein the intensity of the collimated light on the display panel forms a first line spread function having peaks corresponding to the first and second intensities, the peaks being greater than or equal to twice a maximum value of a second line spread function determined by a quadratic phase distribution function.

9. The display device of claim 8, wherein the first line spread function has a full width at half maximum smaller than a full width at half maximum of the second line spread function.

10. The display device of claim 1, wherein the lens has a phase distribution that is associated with a phase distribution function, and wherein a slope of the phase distribution function that corresponds to a boundary of the lens is determined by a minimum Fresnel zone width that is limited by one or more manufacturing conditions of the lens.

11. The display device of claim 1, wherein the lens includes a plurality of electrodes for determining a phase distribution associated with the lens, wherein the lens includes a plurality of Fresnel zones, and wherein none of boundaries of the Fresnel zones is aligned with any of the electrodes in a direction that is perpendicular to the surface of the display panel.

12. The display device of claim 1, wherein the lens includes a plurality of electrodes for determining a phase distribution associated with the lens, wherein the lens includes a plurality of Fresnel zones, wherein at least one of the plurality of Fresnel zones is configured to provide a phase modulation range including a sub-range beyond a range from 0 to $2\pi$.

13. The display device of claim 12, wherein distances between immediately adjacent ones of the electrodes are equal.

14. The display device of claim 13, wherein the phase modulation of the at least one of the Fresnel zones is in a range from about $-\delta-$ to about $2\pi+\delta+$, where $-0.3\times2\pi\leq\delta-\leq+0.3\times2\pi$, and $-0.3\times2\pi\leq\delta-+0.3\times2\pi$.

15. A display device comprising:
a display panel configured to display an image, and
a Fresnel lens disposed in front of the display panel and comprising a plurality of Fresnel zones, the lens configured to have a user perceive images displayed by the display panel as three-dimensional images, a phase distribution function of the lens is symmetrical with respect to a center of the lens, a slope of the phase distribution function has a value of about zero at the center of the lens, the slope of the phase distribution function has a value at boundaries of the lens determined by a width of an outermost Fresnel zone of the lens, the slope of the phase distribution function has a value at an inner position of the lens smaller than the value at the boundaries of the lens, and the phase distribution function of the lens is determined by minimizing a weighted crosstalk or a crosstalk.

16. A display device comprising:

a display panel configured to display an image; and a liquid crystal Fresnel lens overlapping the display panel and comprising a plurality of Fresnel zones, wherein the plurality of Fresnel zones includes a first Fresnel zone, the first Fresnel zone being configured to provide a first phase modulation that is beyond a range of 0 to $2\pi$.

17. The display device of claim 16, wherein the first phase modulation is in a range from about $-\delta^-$ to about $2\pi+\delta^+$, where $-0.3\times2\pi\leq\delta^-\leq+0.3\times2\pi$, and $-0.3\times2\pi\leq\delta^++0.3\times2\pi$.

18. The display device of claim 17, wherein distances between immediately adjacent ones of the electrodes are equal.

* * * * *